(12) United States Patent
Shetty

(10) Patent No.: US 6,454,500 B1
(45) Date of Patent: Sep. 24, 2002

(54) BLADDERLESS DUNNAGE BAG APPARATUS AND METHOD FOR MANUFACTURING SAME

(75) Inventor: Shankara R. Shetty, Milford, OH (US)

(73) Assignee: International Paper Company, Stamford, CT (US)

( * ) Notice: Subject to any disclaimer, the term of this patent is extended or adjusted under 35 U.S.C. 154(b) by 0 days.

(21) Appl. No.: 09/731,421

(22) Filed: Dec. 6, 2000

(51) Int. Cl.⁷ .................................................. B60P 7/16
(52) U.S. Cl. ....................................... 410/119; 410/125
(58) Field of Search ................................ 410/117, 118, 410/119, 125; 383/25, 109, 113; 206/522; 428/35.2

(56) References Cited

U.S. PATENT DOCUMENTS

| | | |
|---|---|---|
| 1,445,070 A | 2/1923 | Clune |
| 1,753,281 A | 4/1930 | Barstow et al. |
| 1,867,071 A | 7/1932 | Collings et al. |
| 2,615,614 A | 10/1952 | Linda |
| 2,648,487 A | 5/1953 | Linda |
| 3,076,592 A | 2/1963 | Means et al. |
| 3,318,759 A | 5/1967 | Anderson |
| 3,386,654 A | 6/1968 | Wallace |
| 3,411,419 A | 11/1968 | Becker et al. |
| 3,775,239 A | 11/1973 | Snow |
| 3,784,085 A | 1/1974 | Kilgore |
| 3,808,981 A * | 5/1974 | Shaw .......................... 410/119 |
| 3,927,825 A | 12/1975 | Stearley |
| 4,088,264 A | 5/1978 | Vogt |
| 4,147,291 A | 4/1979 | Akao et al. |
| 4,387,126 A | 6/1983 | Rebholz |
| 4,997,289 A | 3/1991 | Sasaki et al. |
| 5,431,515 A * | 7/1995 | Sansone et al. ............. 410/119 |
| 5,868,534 A * | 2/1999 | Goshorn et al. ............ 410/119 |
| 6,186,714 B1 * | 2/2001 | Berrier et al. .............. 410/119 |

FOREIGN PATENT DOCUMENTS

CA 956513 * 10/1974 ................. 410/119

* cited by examiner

Primary Examiner—Stephen T. Gordon
(74) Attorney, Agent, or Firm—Frederick H. Gribbell; Richard C. Stewart; Michael J. Doyle

(57) ABSTRACT

A bladderless dunnage bag is provided in which the primary material used for construction is a dunnage material based upon a paper substrate in which one or both of its outer surfaces are coated with a resin material that is impermeable to air and is heat sealable. By use of heat sealable coating materials, a center seal and the end seals of the dunnage bag can be formed in a moving process, and the heat-sealable joints or seals are stronger than the paper substrate material itself, since the heat seals are comprised of the coating material being adhered to itself, rather than the use of an adhesive applied to a paper material as in conventional dunnage bags. In a preferred construction, the dunnage material has a resin coating on both the top and bottom surfaces of the paper substrate, and both lap joints and fin joints can be formed by a heat sealable process that adheres the coating materials together, and does not depend upon the paper material for strength. Moreover, the end joints can be formed by double folding, and again the heat sealable process is used to cause the coating materials to be melted together to form the seal, and not depend upon the strength of the paper substrate. The preferred dunnage bags are constructed of a single ply of dunnage material, or can be constructed of a multi-ply material in which the coated dunnage material is the inner layer; further middle and outer layers can be added made of paper or other materials to improve the bag's bursting strength. A new coating resin material is provided consisting of a low density polyethylene and a metalacene process polyethylene, in a mixture so as to benefit from the metalacene polyethylene while also providing sufficient low density polyethylene to make the material extrudable while being applied to the paper substrate. Therefore, the paper substrate can be coated with the extrudable compound while in motion in a rolling process, and further center seals can also be formed while the material is in a rolling process.

7 Claims, 15 Drawing Sheets

FOLDING

FORMING CENTER SEAL

CREASING AND SLITTING

SINGLE FOLD AND SEAL

DOUBLE FOLD, SEAL REINFORCEMENT

BLADDERLESS DUNNAGE BAG APPARATUS AND METHOD FOR MANUFACTURING SAME

TECHNICAL FIELD

The present invention relates generally to dunnage bags and is particularly directed to dunnage bags of the type which require no separate bladder. The invention is specifically disclosed as a bladderless dunnage bag made of a coated extensible paper substrate material which exhibits properties of being extrudable, impermeable to air, heat sealable, and able to absorb shock energy.

BACKGROUND OF THE INVENTION

FIG. 1 shows a conventional dunnage bag that is constructed of a paper layer as the outer portions and a plastic layer as the inner portions, in which the inner portions or layer is also termed a "bladder." This prior art dunnage bag, generally designated by the reference numeral 10, has been in use for years, and all such paper dunnage bags include the plastic bladder on the interior portions due to the porosity of paper. The plastic bladder is designated at the reference numeral 12, and in many conventional dunnage bags is constructed of polyethylene. In FIG. 1, the two outer layers 14 are each constructed of paper.

The bottom portions (as viewed on FIG. 1) of the conventional dunnage bag 10 are made into a seal, which is generally designated at the reference numeral 20. This seal 20 is typically made to be both air-tight and also watertight in situations where the atmosphere is typically humid, or if the internal air spaces are typically humid. In addition, if the dunnage bag 10 were to be filled with some type of liquid instead of a gas (this would be unusual), then the bladder 12 would also have to be liquid-tight for that particular type of liquid.

Since the seal 20 is typically made by use of an adhesive and by folding the outer paper layer 16 over upon itself, the strength of the paper material used for the outer paper layer 16 is the limiting factor for the strength of this seal at 20. Since the bonding to make the seal is typically paper-to-paper sandwiching glue or other adhesive, the strength of the paper is the limiting factor as noted above, and for many conventional dunnage bags the internal pressure is thereby limited to perhaps 2–3 PSI above atmospheric pressure. If the internal pressure becomes too large, the pressure will cause the paper to fail before the glue itself would fail. While additional layers of paper could be used to increase the dunnage bag's burst rating, it will nevertheless be true that the strength of the paper-to-paper bonding will be the limiting factor of the internal pressure rating of the conventional bag.

As will be understood by those skilled in the art, the conventional dunnage bag illustrated in FIG. 1 represents only a portion of a full dunnage bag that will have seals or paper folds along all of its outer end surfaces. The partial cut-away view of FIG. 1 is illustrative of the construction of such dunnage bags using various layers of materials.

SUMMARY OF THE INVENTION

Accordingly, it is a primary advantage of the present invention to provide a dunnage material capable of forming a bladderless dunnage bag to restrain shipping loads in vehicles, railroad cars, and ships, in which the dunnage material is formed of a paper substrate with a resin coating on at least one of its surfaces.

It is another advantage of the present invention to provide a bladderless dunnage bag having center seals and end seals that are stronger than the paper material that creates the substrate of the dunnage material forming the bag.

It is a further advantage of the present invention to provide an extrudable resin material that can be used as a coating on extensible kraft paper, which can absorb shock energy, is impermeable to air, and is heat sealable, and further after being applied to the kraft paper, will improve the paper's bursting strength, puncture resistance, tear resistance, tensile strength, wet strength properties, and energy absorption properties.

It is yet another advantage of the present invention to provide a method for manufacturing dunnage bags by coating an extensible paper with a resin material on one or both surfaces of the paper, which allows for the formation of a bladderless dunnage bag, and to provide a method in which the coating is applied by an extrusion process, and further to create center seals and end seals that can be heat sealable while the material is in motion.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved material used to construct bags is provided, the material comprising a flexible paper substrate, the paper substrate having a first surface and a second surface; a first coating material substantially covering the entire first surface of the paper substrate, the first coating material comprising a compound consisting of a low density polyethylene and a metalacene process polyethylene; and a second coating material substantially covering the entire second surface of the paper substrate, the second coating material comprising a compound consisting of a low density polyethylene and a metalacene process polyethylene.

In accordance with another aspect of the present invention, a material used to construct bags is provided, comprising a flexible paper substrate, the paper substrate having a first surface and a second surface; and a coating material substantially covering the entire first surface of the paper substrate, the coating material comprising a compound consisting of a low density polyethylene and a metalacene process polyethylene.

In accordance with yet another aspect of the present invention, a bladderless dunnage bag is provided, comprising a flexible sheet material having a substrate with a coating on at least one surface of the substrate, the substrate comprising an extensible material, the coating comprising a material that is impermeable to air, heat sealable, and able to absorb shock energy; and the flexible sheet material being formed into a dunnage bag shape by use of at least one seal along a longitudinal axis of the dunnage bag, and at least one seal along a transverse axis which is substantially perpendicular to the longitudinal axis; in which the coating forms an inner surface of the dunnage bag.

In accordance with a further aspect of the present invention, a method for constructing a bladderless dunnage bag is provided, comprising (1) providing a flexible sheet material having a substrate with a coating on at least one surface of the substrate, the substrate comprising an extensible material, the coating comprising a material that is (a) impermeable to air, (b) heat sealable, and (c) able to absorb shock energy; (2) folding the flexible sheet material over upon itself to begin its shaping into a dunnage bag form; (3) forming at least one seal along a longitudinal axis of the dunnage bag form; and (4) forming at least one seal along a transverse axis which is substantially perpendicular to the longitudinal axis; and in which the coating forms an inner surface of the dunnage bag.

In accordance with still a further aspect of the present invention, a method of manufacturing a bladderless dunnage bag is provided, comprising (1) roll rewinding of a flexible sheet material having a substrate with a coating on at least one surface of the substrate, the substrate comprising an extensible material, the coating comprising a material that is impermeable to air, heat sealable, and able to absorb shock energy; (2) folding the flexible sheet material over upon itself to begin its shaping into a dunnage bag form, and forming a center seal; (3) forming the flexible sheet material into a spaced-apart configuration using a tube forming station; (4) punching a hole in the flexible sheet material and installing and sealing thereto an air inlet valve; (5) slitting side edges proximal to an open end of the dunnage bag form; (6) creasing and folding the first sheet portion along a crease line between the slit side edges; (7) sealing the folded first sheet portion to create an inner end seal; (8) double creasing and double folding both the first and second sheet portions onto themselves along a line proximal to the inner end seal; and (9) sealing both the folded first and second sheet portions to create an outer seal at sufficient locations of the flexible sheet material to achieve an air-tight dunnage bag.

In accordance with yet a further aspect of the present invention, a method of manufacturing dunnage material for use in a bladderless dunnage bag is provided, comprising (1) combining a low density polyethylene material with a metalacene process polyethylene to create a coating resin that is extrudable; (2) providing a roll of uncoated extensible paper, and unwinding that roll such that the extensible paper forms a web that passes an inner coating station and an outer coating station; (3) at the inner and outer coating stations, applying the coating resin to both surfaces of the paper web using an extrusion process; and (4) winding the coated paper web onto a second roll.

In accordance with still another aspect of the present invention, a method of manufacturing a bladderless dunnage bag is provided, comprising (1) combining a low density polyethylene material with a metalacene process polyethylene to create a coating resin that is extrudable; (2) providing a roll of uncoated extensible paper, and unwinding that roll such that the extensible paper forms a web that passes an inner coating station and an outer coating station; (3) at the inner and outer coating stations, applying the coating resin to both surfaces of the paper web using an extrusion process; (4) winding the coated paper web onto a second roll; (5) unwinding the coated paper web from the second roll and directing it to a center seal station where the flexible sheet material is folded over upon itself to form a center seal and to begin its shaping into a dunnage bag form; (6) forming the flexible sheet material into a spaced-apart configuration using a tube forming station; and (7) forming at least one end seal by use of a creasing and folding operation.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
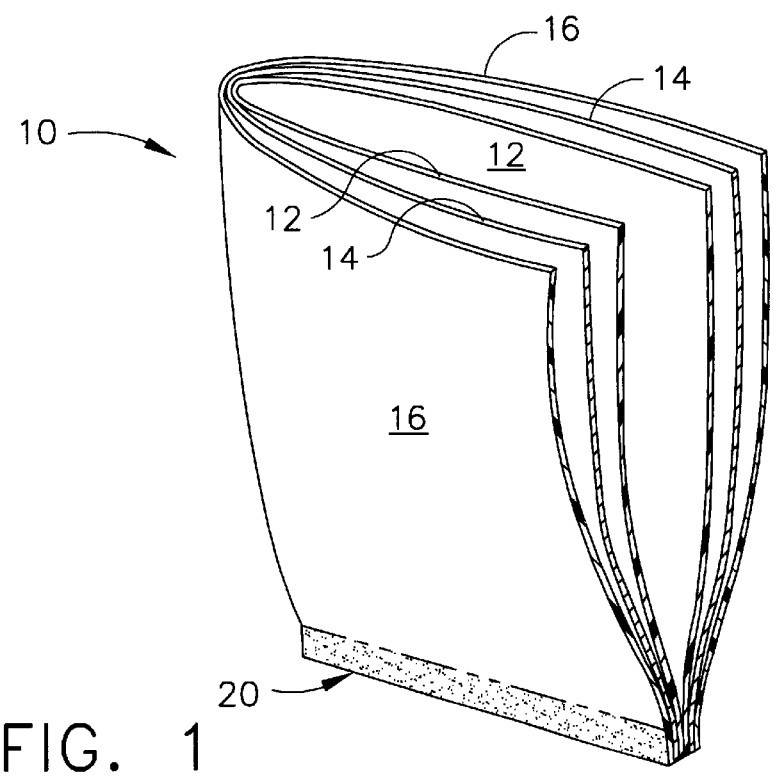
FIG. 1 is a front perspective view in partial cross-section of a prior art dunnage bag.

Reference will now be made in detail to the present preferred embodiment of the invention, an example of which is illustrated in the accompanying drawings, wherein like numerals indicate the same elements throughout the views.

A bladderless dunnage bag is provided in which the primary material comprising the bag is a dunnage material based upon a paper substrate in which one or both of its outer surfaces are coated with a resin material that is impermeable to air and is heat sealable. By use of heat sealable coating materials, a center seal and the end seals of the dunnage bag can be formed in a moving process, and the heat-sealable joints or seals are stronger than the paper substrate material itself, since the heat seals are comprised of the coating material being adhered to itself, rather than the use of an adhesive applied to a paper material as in conventional dunnage bags. In a preferred construction, the dunnage material has a resin coating on both the top and bottom surfaces of the paper substrate, and both lap joints and fin joints can be formed by a heat sealable process that adheres the coating materials together, and does not depend upon the paper material for strength. Moreover, the end joints can be formed by double folding, and again the heat sealable process is used to cause the coating materials to be melted together to form the seal, and not depend upon the strength of the paper substrate.

The preferred dunnage bags can be constructed of a single ply of dunnage material, or can be constructed of a multi-ply material in which the coated dunnage material is the inner layer; further middle and outer layers can be added made of paper or other materials to improve the bag's bursting strength. An inlet air valve is preferably included in the dunnage bag and also is heat sealable by means of applying the air valve to the inner resin coating by the heat sealing process.

A new coating resin material is provided consisting of a low density polyethylene and a metalacene process polyethylene, in a mixture so as to benefit from the metalacene polyethylene while also providing sufficient low density polyethylene to make the material extrudable while being applied to the paper substrate. Therefore, the paper substrate can be coated with the extrudable compound while in motion in a rolling process, and further center seals can also be formed while the material is in a rolling process. With the proper arrangement, end seals can also be formed of tubes of the dunnage material after the center seal has been formed, thereby creating an entire bag in a rolling process.

The heat sealable coating resin preferably has a melt index in a range of 3.0–4.0g/10 minutes, a density of 0.91–0.94 g/cc, a sealing temperature in the range of 105–135° C., and a sealing energy of about 0.54 joules/g/° C. This preferred resin comprises about 10–20% low density polyethylene and about 80–90% Dow ATTANE COPOLYMER (i.e., the metalacene process polyethylene). This coating resin material is extrudable, and can absorb shock energy, is impermeable to air, and is heat sealable. Moreover, once it is applied as a coating onto the kraft paper, it will improve the paper's bursting strength, puncture resistance, tear resistance, tensile strength, wet strength properties, and energy absorption properties.

Figure 2:
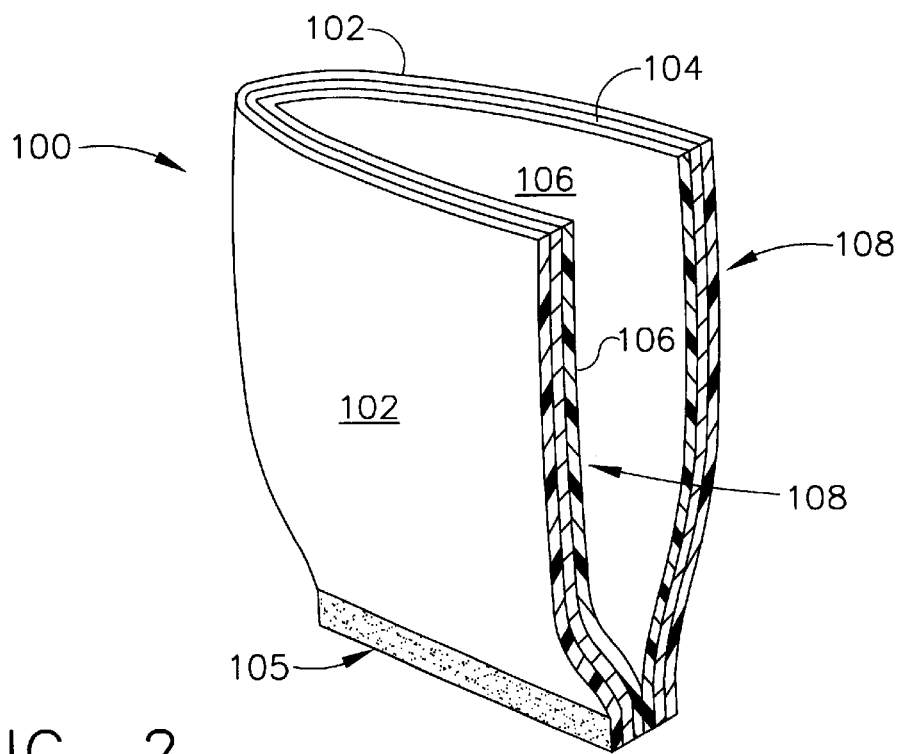
FIG. 2 is a front perspective view in partial cross-section of a single-ply dunnage bag constructed according to the principles of the present invention.

Referring now to the drawings, an improved dunnage bag, generally designated by the reference numeral 100, is illustrated in FIG. 2, and is constructed according to the principles of the present invention. Dunnage bag 100 is not constructed of separate paper and bladder layers, but instead comprises a single sheet or layer having a coated paper substrate, in which the coating material itself acts as the bladder inasmuch as this coating is impermeable to air, and which also protects the paper substrate from any liquid as well, including water or humid air.

Figure 5:
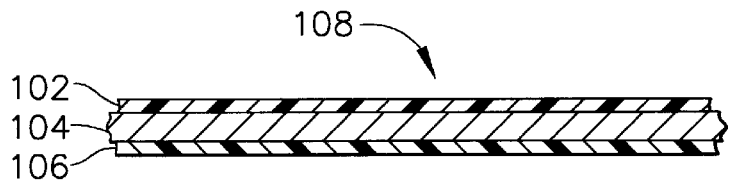
FIG. 5 is a ross-section view showing the details of the dunnage material constructed according to the principles of the present invention.

Dunnage bag 100 is illustrated in FIG. 2 as consisting of three semi-"layers," although in fact there is only a single sheet having a paper substrate designated by the reference numeral 104, and further a coating of a resin or plastic material on both the inner and outer surfaces of this paper substrate. The outer surface acts as a protective and reinforcement coating, and is designated at the reference numeral 102, whereas the inner coating acts as a built-in bladder, and is designated at the reference numeral 106. The overall construction of this coated sheet is generally designated by the reference numeral 108, which represents the entire paper substrate 104 with its inner and outer coatings 102 and 106. The coated paper construction 108 will generally be referred to hereinbelow as "dunnage material," and a more detailed view of its construction is provided in FIG. 5. It should be noted that FIG. 5 is not to scale, as the coating layers are in reality quite thin at this scale.

Figure 10:
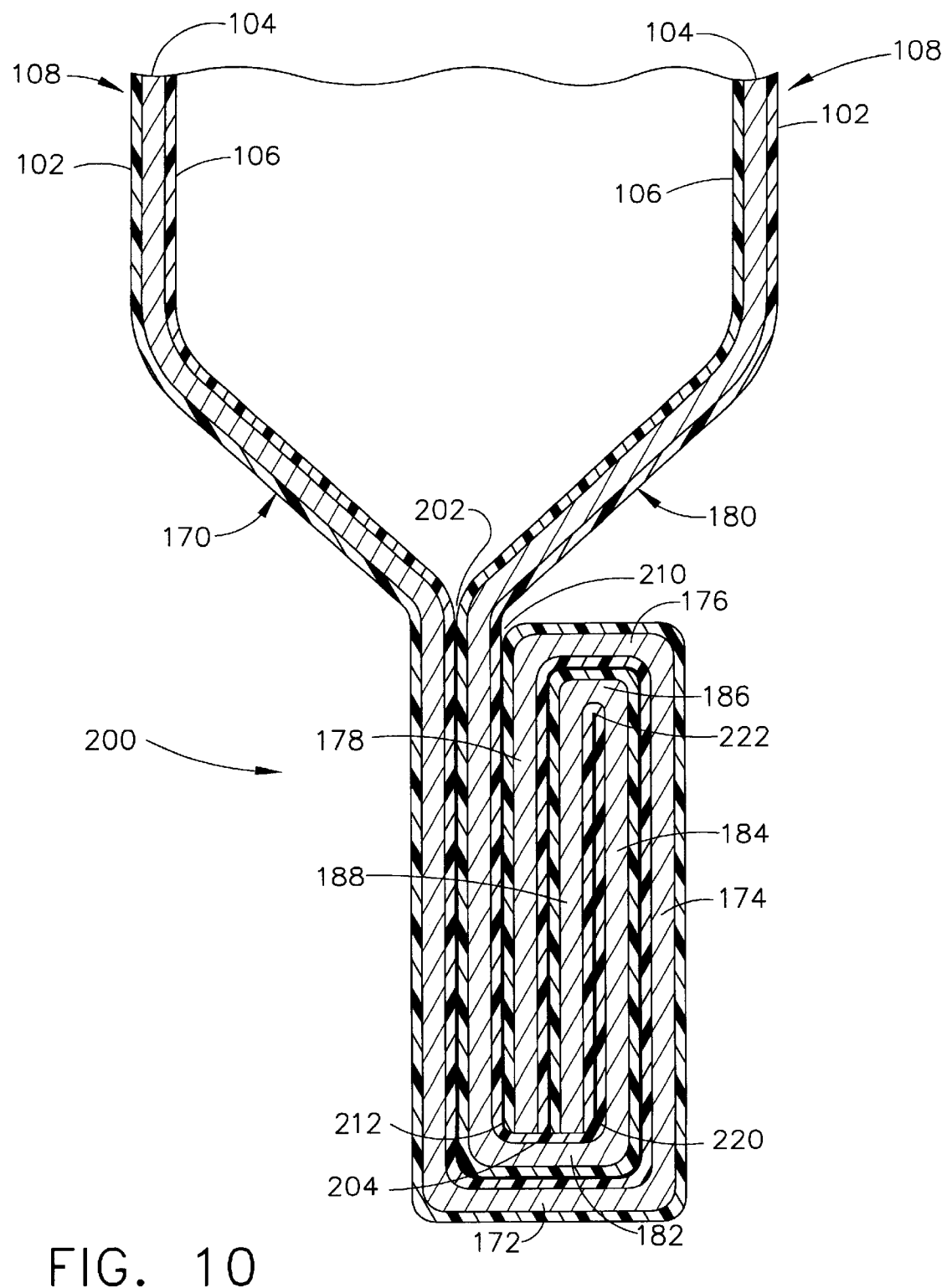
FIG. 10 is a cross-section view of an end seal for a single-ply dunnage bag using the dunnage material of FIG. 5.
Figure 11:
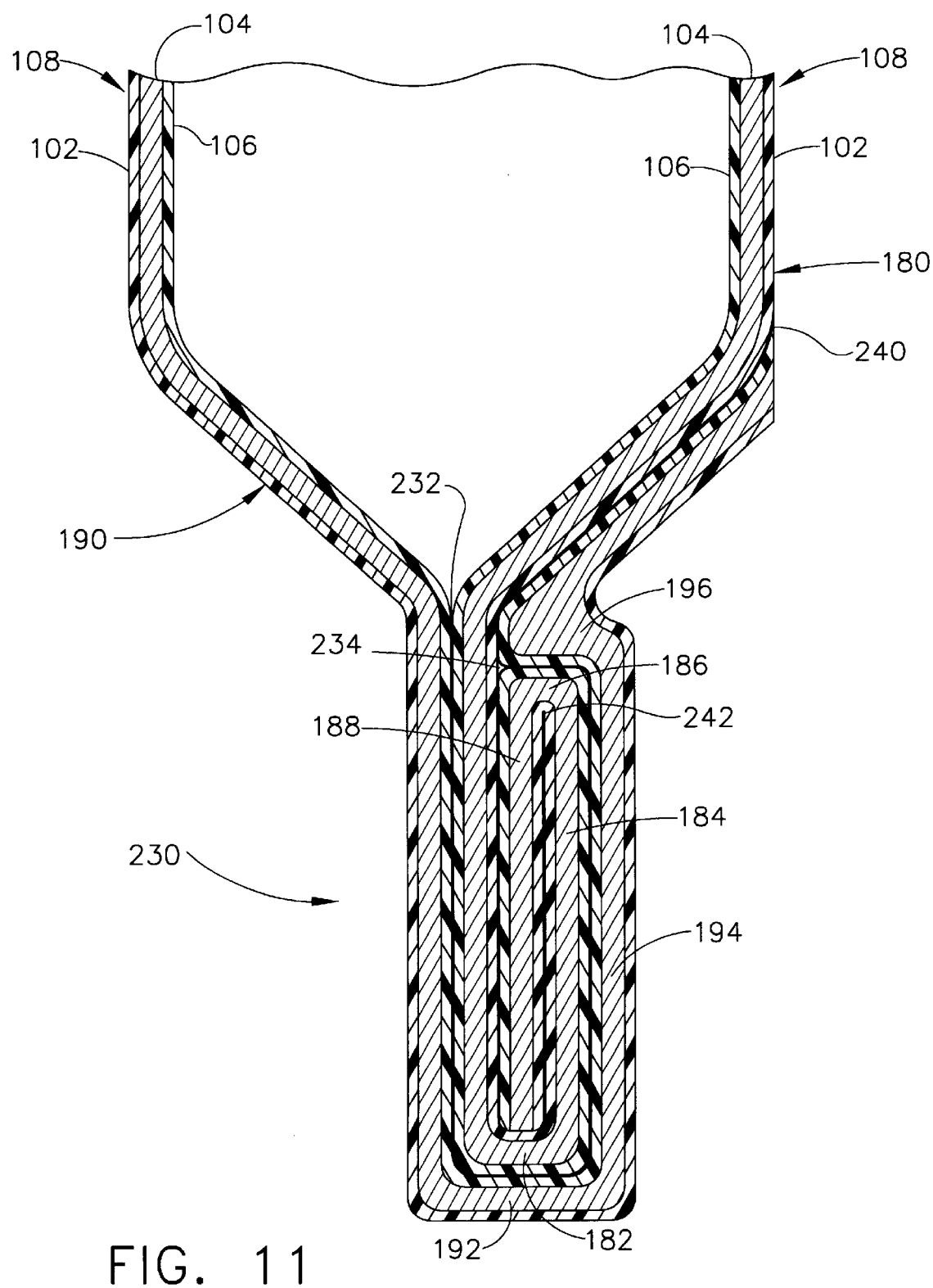
FIG. 11 is a cross-section view of an alternative construction end seal for a single-ply dunnage bag using the dunnage material of FIG. 5.

Dunnage material 108 has a plastic or resin coating on both sides, as described above, and the preferred plastic coating will be not only air protective and liquid protective, but will also be heat sealable, in that the plastic coating will melt at a temperature that is easily achieved by conventional methods. In view of this fact, the dunnage material 108 can be formed into an end seal by merely folding the dunnage material over on itself and pressing its plastic coating (e.g., the coating layer 102) over upon itself, then heating that particular region of the dunnage material to a temperature above the melting point of the plastic coating. After the coating material melts, it is allowed to cool while still under pressure, and will thereby create a seal by adhering to itself as the molten plastic solidifies. This is the preferred method of forming the end seal as illustrated at 105 on FIG. 2. The end seal 105 could be constructed in various ways, and examples of this construction are provided in greater detail in alternative configurations as illustrated on FIGS. 10 and 11. The details of these end seals in FIGS. 10 and 11 are described hereinbelow.

Since the end seal 105 is formed of the plastic coating (e.g., coating 102), the paper substrate layer 104 is not involved in the seal. Therefore, the strength of this seal is dependent upon the strength of the plastic coating, and not depending upon the strength of the paper itself. Therefore, the new improved dunnage bag 100 is substantially stronger when using the same material for its paper substrate as would be used in a conventional dunnage bag, as for example the dunnage bag 10 in FIG. 1. The improved dunnage bag 100 could easily withstand an internal pressure of 18.98 PSI. Moreover, the dunnage bag 100 can be made of a single layer of dunnage material 108, and no separate bladder layer need be added to complete the construction of the dunnage bag.

It is preferred that the same plastic coating be used for the inner surface 106, that will create the "bladder coating," as is used for the outer coating 102 that is the "protective coating" of the entire structure. Of course, it is not necessary that the precise same plastic material be used for both coating materials 102 and 106, although it normally would simplify manufacturing of the dunnage material 108 if the same coating materials were used. Moreover, for some of the end seal configurations described hereinbelow, the inner seal material 106 and the outer seal material 102 will end up being face-to-face during heating and sealing operations, and from that standpoint, the same plastic material would typically be used for both the inner and outer coatings 102 and 106.

The preferred materials for the dunnage material 108 are as follows: for the paper substrate, extensible kraft paper is the preferred choice; for the plastic coating material used in the coatings 102 and 106, a coating resin is preferred that has certain properties that include a melt index in the range of 3.0–4.0 g/10 minutes, a density in the range of 0.91–0.94 g/cc (grams per cubic centimeter), a sealing temperature in the range of 105–135° C., and a sealing energy of about 0.45 joules/g/° C.

The preferred material that is used to create this coating resin is a combination of two different types of polyethylene material. The first component is a low density polyethylene having a target melt index of 0.47 g/10 minutes, and a target density of 0.91 g/cc. This type of low density polyethylene is available from Dow Chemical Company, using a Dow part number 662I, or an equivalent polyethylene material. In the preferred embodiment, this low density polyethylene makes up 10% of the coating resin.

The other major component of the coating resin is another Dow Chemical Company product, having a product name of ATTANE COPOLYMER™, which is a polyethylene manufactured according to a metalacene industry standard process. The target melt index of the ATTANE COPOLYMER material is 4.0 g/10 minutes, and the target density is 0.91 g/cc. This ATTANE COPOLYMER preferably makes up 90% of the coating resin.

While the metalacene polyethylene process creating the Dow ATTANE COPOLYMER provides a material that would be typically suitable for the inner surface of a dunnage bag, this ATTANE COPOLYMER material by itself is not readily extrusible, and therefore is somewhat difficult to work with when trying to produce large quantities of dunnage material (e.g., dunnage material 108) for application to large quantities of dunnage bags. The addition of a relatively low percentage of the low density polyethylene (e.g., Dow 662I) allows the overall coating resin to obtain properties which make it readily extrusible, and therefore the dunnage material 108 can be created in an extrusion operation. The manufacturing procedures related to the dunnage material 108 of the present invention are described hereinbelow, with reference to FIGS. 26–31.

The low density polyethylene used for the relatively small percentage of the coating resin alternatively can have a melt index other than the exact target of 0.47 g/10 minutes, and a range of melt indexes falling within 0.4–0.54 g/10 minutes would certainly be suitable. Likewise, the density of the low density polyethylene could fall somewhat outside the target of 0.91 g/cc, and for example could have a range of 0.91–0.96 g/cc. Of course, other suitable materials could be used without departing from the principles of the present invention, and moreover, the exact percentage of the low density polyethylene in the final coating resin could also vary without departing from the principles of the present invention. In fact, if the low density polyethylene material made up as much as 20% of the coating resin, the coating resin would still be suitable for application in extruding processes to manufacture the dunnage material 108, which means that the Dow ATTANE COPOLYMER would make up as little as 80% of the coating resin.

Figure 3:
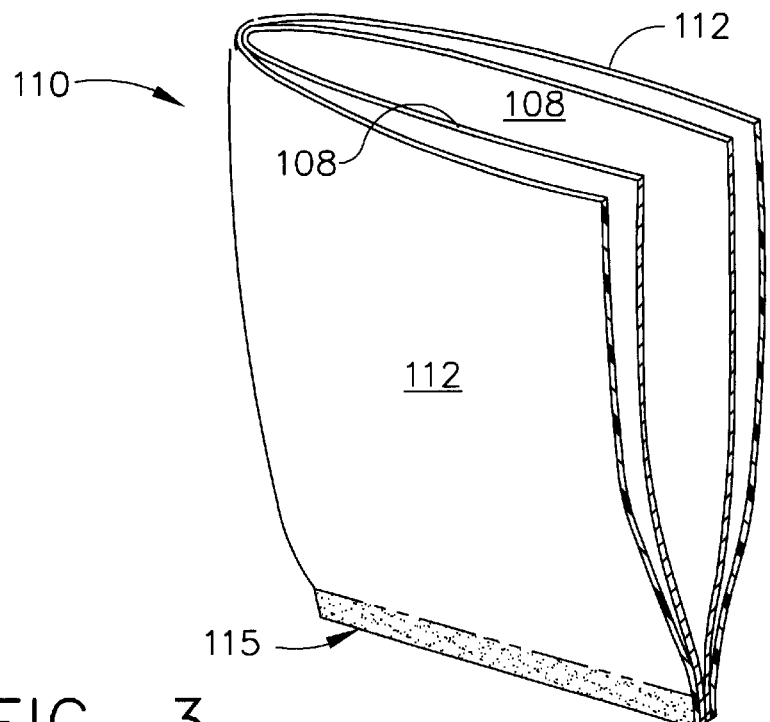
FIG. 3 is a front perspective view in partial cross-section of a 2-ply dunnage bag constructed according to the principles of the present invention.

FIG. 3 illustrates a two-ply dunnage bag, generally designated by the reference numeral 110. Dunnage bag 110 comprises an inner layer or ply that is made of the dunnage material 108, and the second ply comprises an outer layer, which is designated by the reference numeral 112. Since the inner layer 108 is coated on both sides, it can act directly as the bladder-type component for a dunnage bag, without the need for a separate polyethylene bladder that is found in prior art conventional dunnage bags. The outer layer 112 can also comprise dunnage material similar to the inner layer 108, in which the kraft paper is coated on both sides by the coating resin, as described hereinabove.

Figure 6:
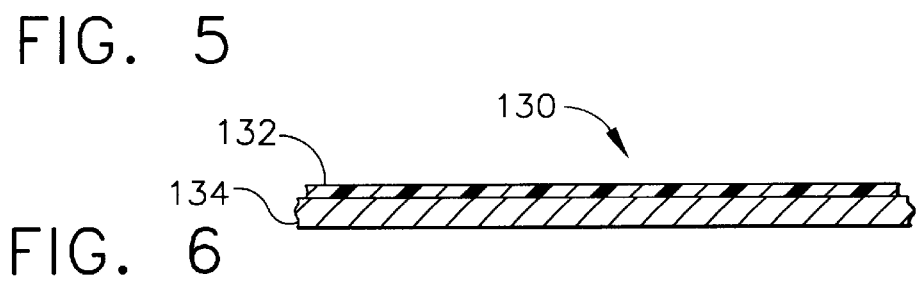
FIG. 6 is a cross-section view of an alternative construction dunnage bag material according to the present invention.

As an alternative construction, the outer ply material 112 could be coated on only one side, so that it would have the form of a paper substrate and a resin coating on one side only, similar to that illustrated in FIG. 6 at the reference numeral 130. In FIG. 6, the paper substrate is indicated at 134, whereas the resin coating is indicated at 132. Depending upon the application for the dunnage bag 110, the resin coating could be placed either on the outside surface of the dunnage bag 110, or on the inner surface of the ply 112.

A further alternative construction of the dunnage bag 110 would be for the outer layer 112 to merely be paper without any coating material such as the resin described above. This extra layer of paper at 112 could be used to increase the overall strength of the bag, including its bursting strength properties.

As viewed in FIG. 3, the dunnage bag 110 is illustrated in partial cut-away section view, and the bottom of the dunnage bag is illustrated as having an end seal at 115. If the dunnage bag 110 comprised two plies of paper that is coated on both sides, then the end seal construction at 115 would be similar to that illustrated in FIG. 12.

Figure 4:
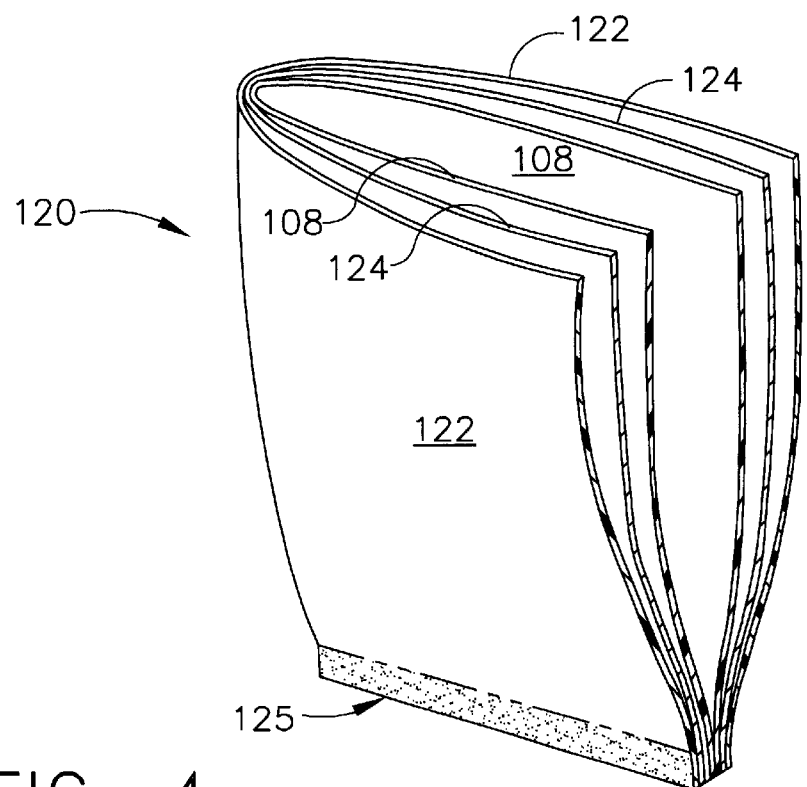
FIG. 4 is a front perspective view in partial cross-section of a multi-ply dunnage bag constructed according to the principles of the present invention.

FIG. 4 illustrates a dunnage bag having multiple plies, generally designated by the reference numeral 120. Multi-ply dunnage bag 120 consists of three separate plies in the example of FIG. 4. The inner ply is made of the dunnage material 108, which includes the kraft paper substrate that is coated on both sides by the resin as discussed hereinabove.

The outer coating at 122 could comprise many different materials, including paper for extra bursting strength properties. Of course, the outer layer 122 could also comprise the dunnage material 108, having a paper substrate that is coated on both sides by the resin material of the present invention, although that type of material would not be necessary for many applications of dunnage bags.

The middle layer at 124 also could comprise various materials, including any type of film material, cloth or other woven material, a non-woven material, such as paper, or it could also comprise the dunnage material 108 having a paper substrate and coated on both sides. As with regard to the outer layer 122, the middle layer 124 has a primary purpose of increasing the overall strength of the dunnage bag 120, and the choice of the material used for this layer 124 would be in accordance with the strength requirements for the overall bag 120.

Figure 12:
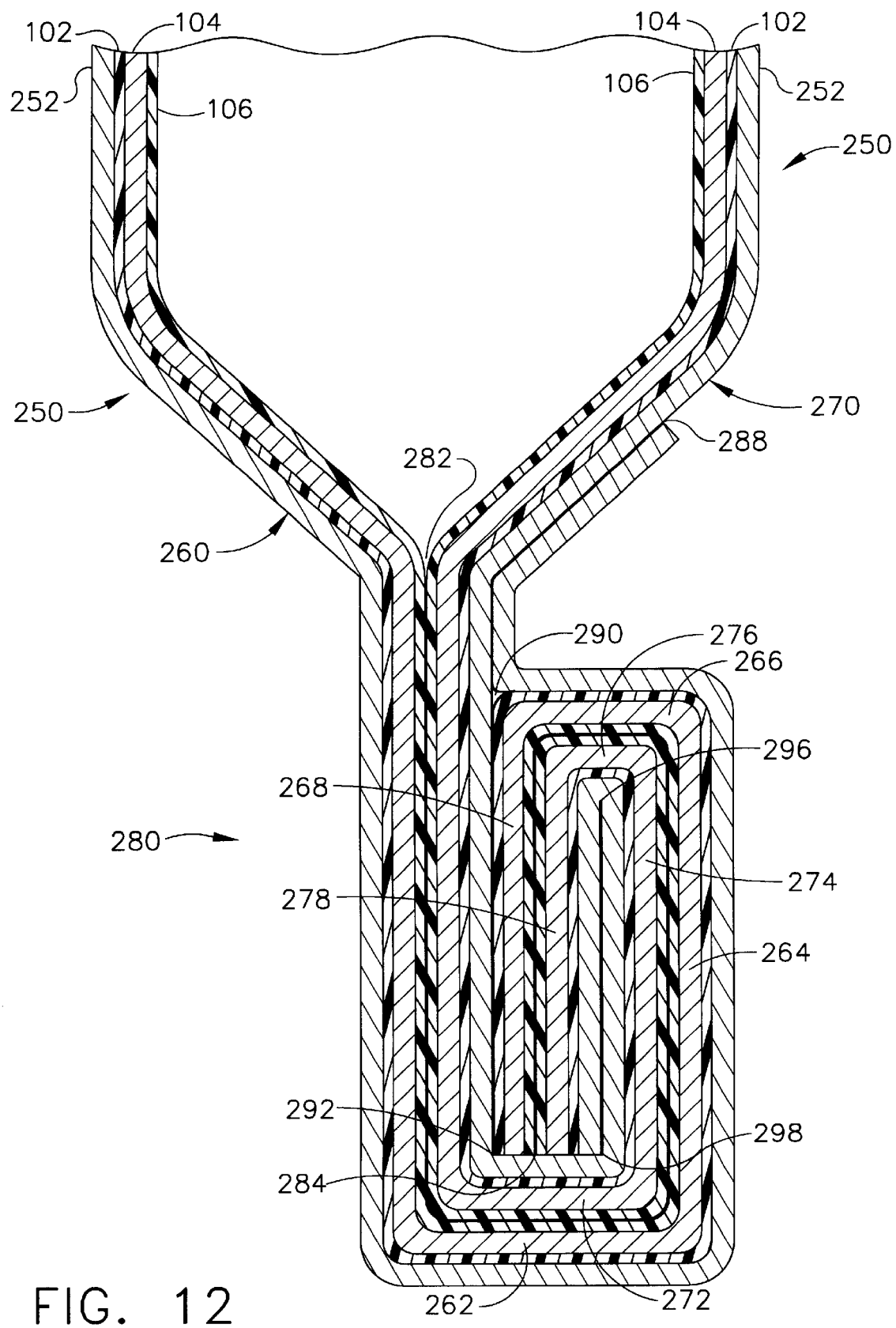
FIG. 12 is a cross-section view of an end seal of a dunnage bag using a 2-ply dunnage material which includes the dunnage material of FIG. 3.

The multi-ply dunnage bag 120 of FIG. 4 is shown in a partial cut-away view, and its bottom portions have an end seal 125. End seal 125 would have some similarities in appearance to the end seal 115 of FIG. 3, in which an example was suggested as illustrated in FIG. 12. In all cases of the end seals formed using the dunnage material 108 as the innermost layer or ply, the resin coating of the very innermost portions of the inner layers 108 will always be available for sealing purposes to create a very strong seal that will increase the overall strength of the dunnage bag, regardless of the types of materials used in the additional layers of a multi-ply bag. The details of this construction will be described hereinbelow in reference to FIGS. 10–12.

Figure 7:
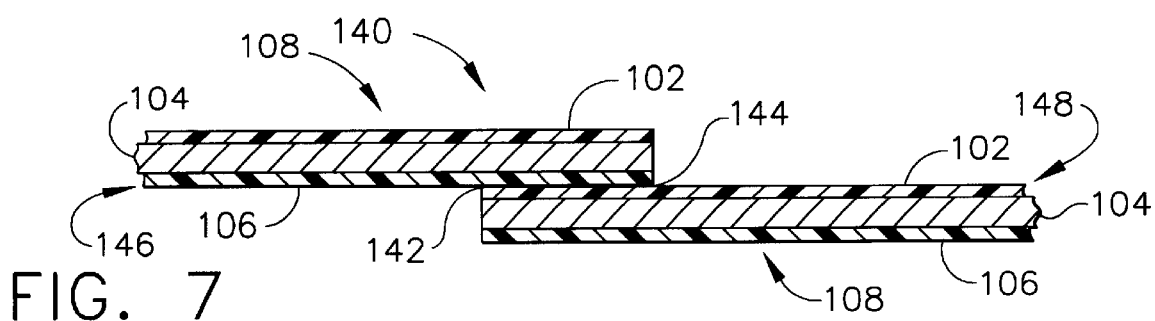
FIG. 7 is a cross-section view of a lap joint using the single-ply dunnage material of FIG. 5.

FIG. 7 shows details of a lap joint or lap seal, generally depicted by the reference numeral 140, and comprised of two separate edges of a sheet comprised of dunnage material 108. This particular lap joint is very useful in creating a center seal for a dunnage bag, such as the center seal 402 depicted in FIG. 18. As can be seen in FIG. 7, each end portion of the dunnage material 108 includes a paper substrate at 104, a top coating of resin material at 102, and a bottom coating of resin material at 106. Since the resin material is heat sealable, it is quite convenient to press the bottom layer 106 of the uppermost ply at 146 of the dunnage material 108 against the top resin coating 102 of the bottommost ply at 148 of the dunnage material. Once the two resin layers 106 and 102 are adjacent to one another, heat energy may be applied to melt the resin material, and upon cooling and solidification of the resin material, a joint will be formed between the points 142 and 144. It will be understood that the top ply and bottom ply in FIG. 7 would both typically be of the same single sheet of dunnage material, to form a center seal.

This lap joint between 142 and 144 is the type of stronger joint that lends additional strength to a dunnage bag that is constructed of the dunnage material 108, in which the strength of the resin coating material itself is the main factor in determining the strength of the bag, since the paper substrate layers 104 do not enter into the equation when determining the tearing strength of the bag (at this lap seal in particular). Naturally, other configurations of center seals can be constructed using the principles of the present invention, and another example is a fin joint or "fin seal" as illustrated at 150 in FIG. 8.

Figure 8:
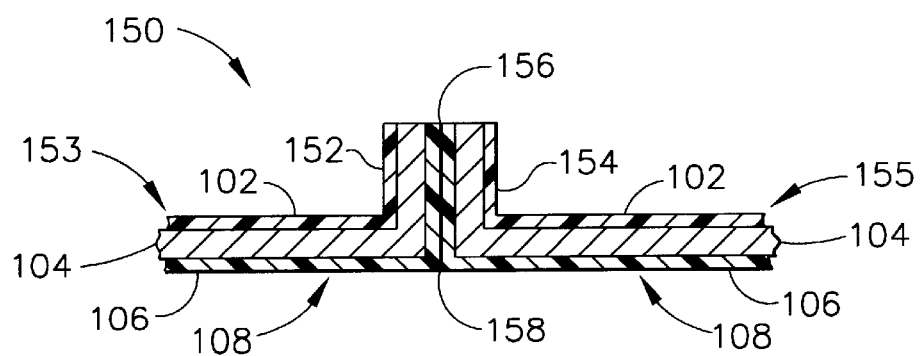
FIG. 8 is a cross-section view of a fin joint using the single-ply dunnage material of FIG. 5.

In FIG. 8 the fin joint 150 is illustrated as being constructed of two portions of the dunnage material 108, which are joined in a single plane at which the two portions of the dunnage material are bent at approximately a right angle which is the area where the joint is made. More specifically, the left-hand portion 153 of dunnage material 108 (on FIG. 8) is brought in at a horizontal plane until reaching a point at 158 where the material is bent upward at a 90° angle. Similarly, the right-hand portion 155 of the dunnage material (as viewed on FIG. 8) also comes in along the same horizontal plane and also is bent up at a 90° angle at 158. It will be understood that the top ply and bottom ply in FIG. 8 would both typically be of the same single sheet of dunnage material, to form a center seal.

The left-hand dunnage material 108 has a top layer of resin material as a coating at 102, and after being bent upward, that coating is designated at the reference numeral 152. Similarly, the right-hand dunnage material 108 has a top coating layer at 102, and after being bent upward becomes a coating layer designated by the reference numeral 154. In this configuration, the bottom coating layers 106 of both left-and right-hand portions of the dunnage materials illustrated on FIG. 8 are pressed together at the point 158 where the dunnage material is bent upward. Once placed into this adjacent arrangement, heat energy can be applied to melt the resin coating material 106 between the points 156 and 158, and upon cooling under pressure and solidification of the resin coating, a seal will be formed between those points 156 and 158. As in the previous examples described hereinabove, this seal becomes the main factor of the mechanical strength of a dunnage bag that employs this type of fin joint illustrated in FIG. 8, and the paper substrate at 104 does not enter into the equation as to its tearing strength along the joint.

Figure 9:
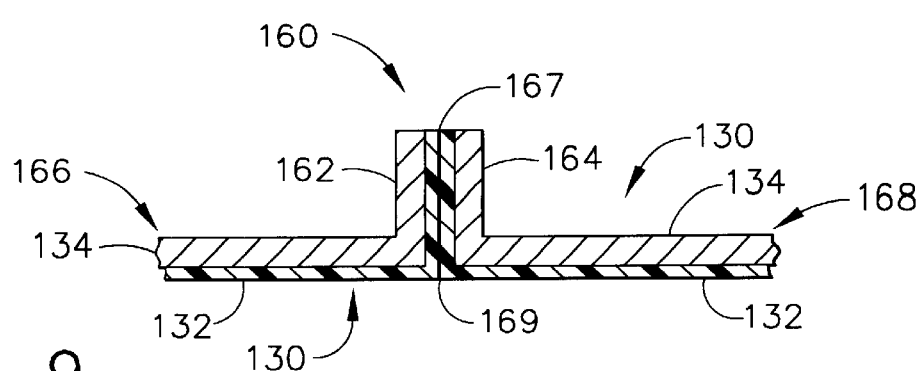
FIG. 9 is a cross-section view of a fin joint using the alternative dunnage material of FIG. 6.

FIG. 9 illustrates another fin joint construction generally designated by the reference numeral 160. In FIG. 9 the dunnage material is not coated on both sides, but instead uses the single-sided resin coating material as illustrated in FIG. 6, and designated by the reference numeral 130. Each portion of the single sided dunnage material 130 has a paper substrate at 134 and a resin coating at 132, and the two portions 166 and 168 are brought together along a horizontal plane until they meet at the point 169. At this point 169, the dunnage material is bent upward, as is illustrated at 162 and 164, respectively. Once placed into this adjacent arrangement, heat energy can be applied to melt the resin coating between the points 167 and 169. Once the resin has been melted, the heat energy can be withdrawn and the resin under pressure can be cooled to below its solidification point, thereby creating a seal that is stronger than the paper substrate material alone.

The arrangement illustrated in FIG. 9 is not necessarily the preferred construction for a fin joint of a dunnage bag using the principles of the present invention, however, it can be used in many applications that do not require the resin coating on both sides of the paper substrate. Of course, the dunnage material 130 could not by itself be used to form a lap joint as illustrated in FIG. 7, since the lap joint requires both a top and bottom coating of the resin material to be used in the manner as illustrated in FIG. 7.

Now referring to FIG. 10, an end seal construction is illustrated in great detail using a single-ply dunnage material that is coated on both sides, as in the dunnage material 108. Coming in from above on FIG. 10, a left-hand portion of dunnage material is indicated by the reference numeral 170, and a right-hand portion of dunnage material is indicated by the reference numeral 180. Each portion of dunnage material 170 and 180 will preferably comprise a paper substrate 104, an outer protective coating at 102, and an inner bladder coating at 106. As has been described hereinabove, these resin coatings 102 and 106 are integral portions of the overall material that includes the paper substrate 104, and there is no separate bladder layer or separate bladder ply that is needed to form the dunnage bag that is formed by the use of this dunnage material 108.

On FIG. 10, the end seal construction is generally designated by the reference numeral 200, which is formed by several folds and layers of the dunnage material 108. In a preferred construction end seal 200, the two portions of dunnage material 170 and 180 are brought together at a point 202, and then run downward (on FIG. 10) in parallel for a short distance until they are both bent along a substantially right angle in the same direction to form line segments (as seen on FIG. 10) at 172 and 182, respectively. In reference to FIGS. 10, 11, and 12, when the term "line segment" is used with respect to these views, it will be understood that the actual structure is a plane of material that extends into and directly out from the page to one viewing this drawing. In other words, this end seal 200 is very long at this scale, and runs along the entire length of the bottom of the dunnage bag, as would be viewed in FIG. 10 wherein the dunnage bag is formed above the end seal in the spaces between the two layers or sheet portions 170 and 180.

The dual layers of dunnage material 108 now continue after turning another substantially right angle and now are directed upwards (as seen on FIG. 10) along the line segments 174 and 184. While still maintaining their parallel pathways, the two layers continue through another substantially right angle along line segments at 176 and 186, and then again turn another substantially right angle and are directed downwards (as viewed on FIG. 10) along line segments 178 and 188.

Once the folded construction illustrated on FIG. 10 has been completed, the materials are subjected to heat energy that will raise the temperature of the resin coating above its melting point, and after the adjacent resin coatings have melted together under pressure, the end seal will then be cooled under pressure to below the solidification or freezing point of the resin coatings. This will ensure a strong seal that will, as noted above, be stronger than the paper substrate alone.

By use of the illustrated end seal 200 construction, the adjacent dunnage materials 170 and 180 will form a seal along several line segments and angular bends, starting at the point 202, then going (on FIG. 10) downward, across to the right, upward, across to the left, and finally downward again until terminating at a point 204. This run just described in the previous sentence is a single parallel surface between the two dunnage material layers, and will become a continuous strong seal once the above-described melting and cooling processes have taken place. This particular seal would be formed even if the dunnage material itself was coated by the plastic resin only on a single side, so long as that single side was the inner side (i.e., at 106 of the illustrated embodiment in FIG. 10). However, other seals are formed by use of the preferred dunnage material 108 that has plastic resin coatings on both of its surfaces.

Some of the secondary seals in the end seal 200 that are formed by use of the dunnage material 108 having coatings on both surfaces are illustrated in FIG. 10 between the following points: the upper point 210 down to a lower point 212; and a lower point 220 to an upper point 222. In the case of the seal that is formed along the line segment (on FIG. 10) between the points 210 and 212, this seal is formed using the outer resin coatings 102 of the two different dunnage material portions, i.e., portions 170 and 180 after they have been folded several times. Similarly, the seal formed along the line segment between the points 220 and 222 is created from the "outer" coating of the dunnage material portion 180 as it is folded against itself along the final fold of the end seal 200. As in the case of previous examples discussed hereinabove, since the coating material forms seals against a second layer of coating material in every important sealing area of the end seal 200, the end seal is itself much stronger than the strength of the paper substrate material in the substrate layer 104.

FIG. 11 illustrates an alternative construction end seal, generally designated by the reference numeral 230. End seal 230 again uses a single ply of the dunnage material 108 to form the end seal itself, and the outer portion of the dunnage bag is formed from two separate portions of sheets of dunnage material, designated by the reference numerals 190 on the left and 180 on the right, as viewed in FIG. 11. The dunnage material 108 that comprises the sheet portion 180 in FIG. 11 has the same general configuration as the sheet portion 180 observed in the end seal illustrated in FIG. 10. In other words, the sheet portion of dunnage material 180 comes together with the opposite sheet portion 190 at a point 232, but then travels in a downward direction (as seen on FIG. 11) until it makes a substantially right angle and forms a line segment on the drawing at 182, then makes another substantially right angle and travels upward at 184, then makes another right angle to form a line segment 186, then finally undergoes another substantially right angle to form a substantially downward line segment at 188. This is essentially the same configuration as illustrated in FIG. 10.

The second portion of dunnage material at 190 also forms similar line segments and angles as viewed in the cross-sectional view of FIG. 11. After making a first substantially right angle, it forms a line segment at 192, then undergoes another substantially right angle to form an upward line segment at 194. At this point, however, the second portion 190 of dunnage material does not make a further right angle and form a line segment to the left as viewed on FIG. 11, but instead forms a reinforcing fold-over seal, as seen at 196 on FIG. 11. This fold-over portion or member at 196 is pressed against the outer coating of the dunnage material portion 180 starting at a point designated at the reference numeral 240, and continuing to a point designated by the reference numeral 234. This provides additional strength both as an additional seal, and as additional paper substrate material for bursting strength properties, just at the point that end seal 230 joins the rest of the dunnage bag sheet material.

In addition to the above seals, another secondary seal is formed between the points designated by the reference numerals 242 and 234 along three line segments that are formed by the substrate of the layer 180 being folded over upon itself along the segments 184 and 188. This secondary seal is another continuous seal that is formed when heat is applied to the end seal 230, and the plastic resin coating material will melt and form a solidified seal under pressure once it is cooled.

FIG. 12 illustrates another end seal generally designated by the reference numeral 280, in which a 2-ply material is used to form the dunnage bag. In this example of FIG. 12, the 2-ply dunnage material includes a kraft paper substrate at 104 that is coated on both sides at 102 and 106, as well as an outer paper layer at 252. Each portion constructed as according to the previous sentence is generally designated by the reference numeral 250, and there are two such portions: a left-hand portion 260 and a right-hand portion 270, as viewed on FIG. 12.

The two portions of the 2-ply dunnage bag material at 260 and 270 come together at a point 282, and then travel directly downward (as seen on FIG. 12) in a parallel relationship in which the inner coatings 106 of both dunnage material portions 260 and 270 contact one another. This adjacent contact will eventually become a seal once the material has been formed and the entire seal structure 280 is heated. The two dunnage material portions 260 and 270 form a substantially right angle and follow a line segment at 262 and 272, respectively, and then form another right angle and travel along a vertical line segment at 264 and 274, respectively. The dunnage material portions both make another right angle and travel along a horizontal line segment at 266 and 276, respectively, and certain portions then make another substantially right angle and travel downward along a line segment 268 and 278, respectively.

In this arrangement, the entire dunnage material 270 makes the downward turn to form the line segment 278 as seen on FIG. 12, however, the dunnage material portion 260 does not entirely move in the downward direction as seen on FIG. 12. Instead, the innermost portion that comprises the kraft paper 104 and its dual outer coatings 102 and 106 move in the downward direction, as seen at 268; however, the outer paper portion 252 splits off at a point 290 and instead moves upward and forms a reinforcing fold-over seal between the points at 290 and 288. This reinforcing seal between the points 290 and 288 must use some other type of adhesive, since there is no plastic or resin coating on this portion of the material that makes up the paper layer 252 that is split off and forms the fold-over seal portion.

When heated under mechanical pressure, the resin coatings of the dunnage material that has a paper substrate 104 form seals along line segments, including a very long seal between the two innermost resin coatings 106 that starts at the point 282, travels downward, then to the right, upward, to the left, and downward again to terminate at a point 284. This relatively long seal ensures that the two dunnage materials portions 260 and 270 will remain sealed together up to the strength of the resin material itself, rather than relying upon the tearing strength of the kraft paper substrate 104.

A secondary seal is also formed between a resin layer of the outer coating 102 of the left-hand dunnage material portion 260 and the outermost paper layer 252 of the right-hand dunnage material portion 270 between the points 290 and 292. This particular secondary seal is not as strong as some others since the paper material that makes up the outer layer 252 will be involved in the strength of the seal itself. A further secondary seal could be made between the outer paper layers that become adjacent to one another between the points 296 and 298, although a separate adhesive would have to be applied when using the construction of FIG. 12. Naturally, if the outermost layer of the dunnage material had a resin coating that would be heat sealable, then all of the secondary seals noted above would thereby become relatively strong seals and no separate adhesives at all would be required when creating the overall end seal 280. This may not be required for many applications of the dunnage bag formed by end seal 280, although there could be times where additional paper layers or paper layers having an outer resin coating could be useful.

Figure 13:
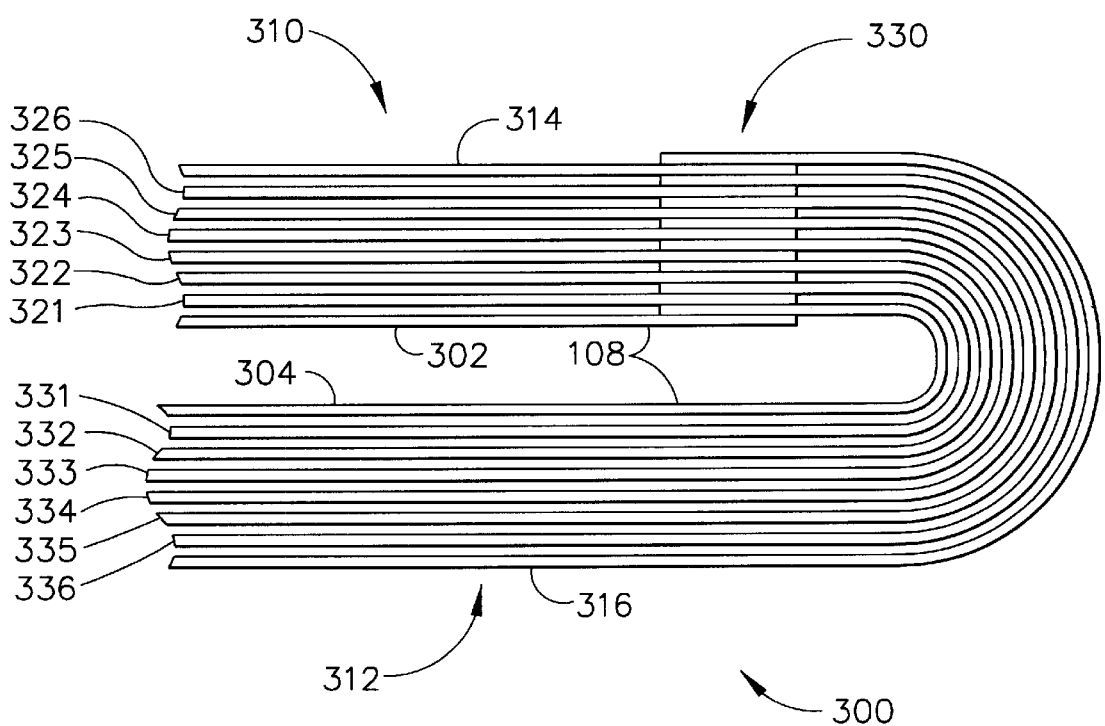
FIG. 13 is a cross-section view of a multi-ply dunnage bag joint in which additional paper layers are interspersed at the joint.

Another multi-ply end seal construction is illustrated in FIG. 13 by a U-shaped seal construction designated by the reference numeral 300. In FIG. 13, each portion of the dunnage material that is used to create the dunnage bag contains multiple paper layers that are interspersed between one another to make the actual seal, at the location designated by the reference numeral 330. On FIG. 13, the first dunnage material portion is designated at 310, and the second dunnage material portion is designated at 312. Each of these dunnage portions 310 and 312 include an inner ply that comprises dunnage material 108 having a kraft paper substrate and an inner and outer coating of resin that is heat sealable. Furthermore, each dunnage material portion 310 and 312 includes six interior paper layers.

For the upper dunnage material portion 310 (as viewed on FIG. 13), the innermost layer comprises the dunnage material 108, and has a resin coating to form the bladder, as indicated at the reference numeral 302. An outer paper ply is provided at 314, and the multiple inner reinforcement paper plies are designated by the reference numerals 321–326.

For the lower (on FIG. 13) dunnage material portion 312, again the innermost ply comprises the dunnage material 108 which has a resin coating to form the bladder material, as designated at the reference numeral 304. The outermost layer is made of paper, as at the numeral 316, and there are six inner reinforcement paper plies at the reference numerals 331–336.

After the sheets or plies 321–326 and 331–336 are interspersed at the area 330 where the joint will be made, the material is heated so as to melt together the resin coatings of the innermost layers at 302 and 304. A different adhesive, or for that matter some more of the same resin coating material, could be applied to the end portions of the two different portions of the dunnage material so that, when heated, all of the paper plies will also be sealed together in the area at 330. Of course, if desired, the paper layers at 330 could be glued together by a different process altogether, which may or may not require any heat application.

Figure 14:
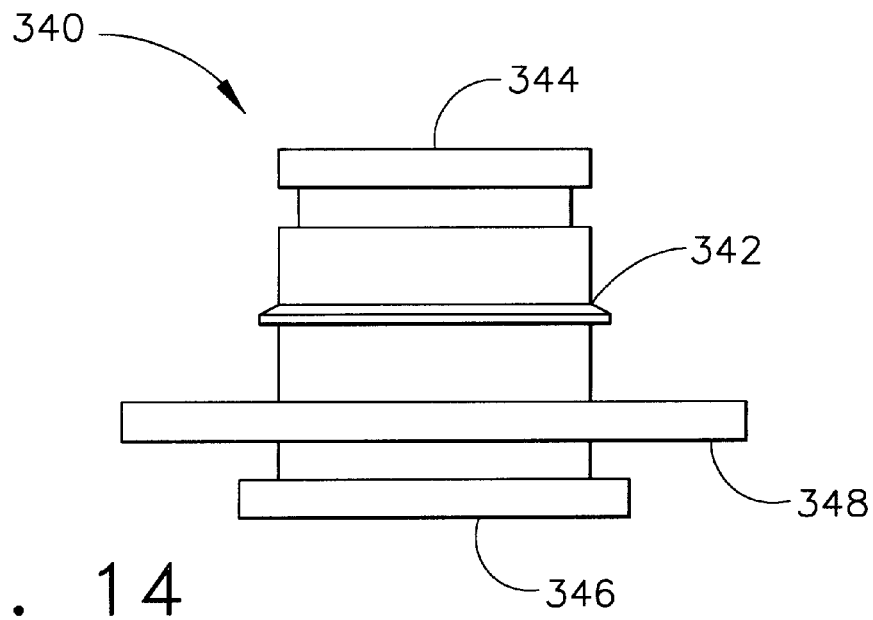
FIG. 14 is a cross-section view of an air inlet valve known in the prior art, and used with the dunnage bag of the present invention.

FIG. 14 illustrates an air inlet valve known in the prior art, generally designated by the reference numeral 340. The air inlet valve 340 is typically placed in a dunnage bag so as to be able to pressurize the dunnage bag once it has been placed within an empty volume of shipping cartons so as to assist in holding them in place. The valve 340 has a cylindrical side wall body portion at 342, an inlet at 344, and an outlet at 346. Around the valve body exterior is a substantially round flange 348.

Figure 15:
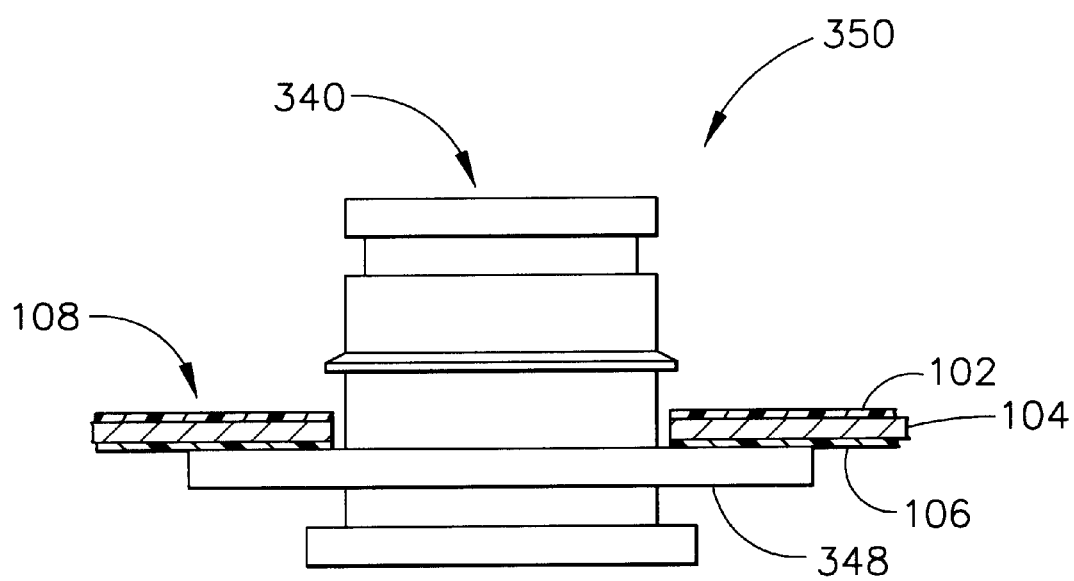
FIG. 15 is a cross-section view of an air inlet valve that has been sealed with the dunnage material of FIG. 5.

In FIG. 15, the inlet valve 340 is illustrated as being sealed within a dunnage bag portion of material, and this sub-assembly is generally designated by the reference numeral 350. The flange 348 has been sealed to the inner one of the resin coatings of the dunnage material 108. The dunnage material coating 106 preferably is heat-sealed to the flange 348, thereby creating a substantially strong seal so that there will be no air leaks around the body or flange of the inlet valve 340.

Figure 16:
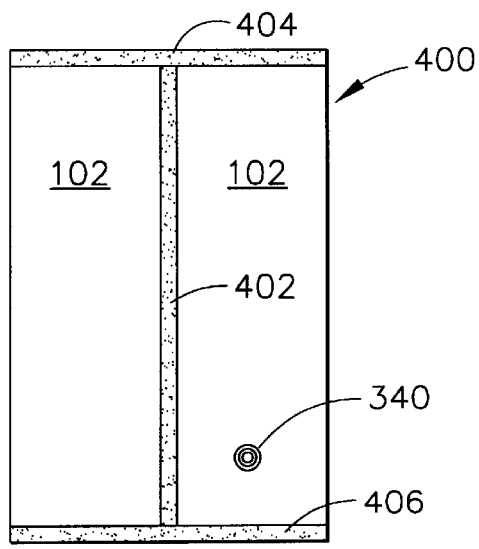
FIG. 16 is a front view of a flat (deflated) dunnage bag constructed according to the principles of the present invention.

FIG. 16 illustrates an empty dunnage bag generally designated by the reference numeral 400. Dunnage bag 400 has a top end seal at 404, a bottom end seal at 406, and a longitudinal center seal at 402; these seals preferably are constructed according to the principles of the present invention. For example, if dunnage bag 400 uses a single ply of dunnage material 108, then the end seals 404 and 406 will look much like the end seal 200 illustrated in FIG. 10, or the end seal 230 illustrated in FIG. 11. Moreover, the center seal 402 will preferably have the appearance of either the lap joint depicted in FIG. 7, or the fin joint depicted in FIG. 8.

Since the preferred material utilizes dunnage material 108 for at least the inner layer or ply, the dunnage bag 400 will not require a separate bladder as in conventional dunnage bags. Assuming that a single-ply material is used, then the outer surface of dunnage bag 400 will consist of the resin coating 102 which coats a paper substrate 104, as seen in FIG. 5. In FIG. 16, the air inlet valve 340 is located in the lower right-hand corner in this view, and preferably is permanently sealed to the interior resin coating 106.

Figure 17:
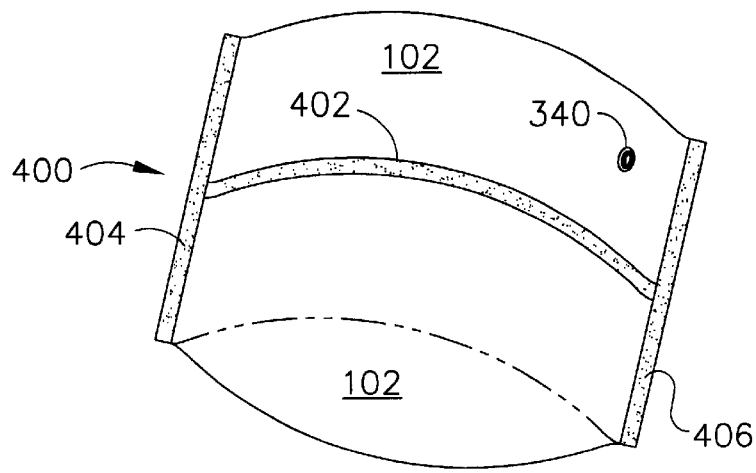
FIG. 17 is a perspective view of the dunnage bag of FIG. 16 after it has been inflated.

FIG. 17 illustrates the same dunnage bag 400 after it has been filled with air through the air valve 340. The "air pillow" shape of the inflated dunnage bag 400 is easily discerned in FIG. 17, and the end seals 404 and 406 can be seen as playing their important role in holding the dunnage bag together at its "ends." Furthermore, the center seal 402 is illustrated as running along the inflated portion of the bag 400, essentially along its longitudinal axis as seen in FIGS. 16 and 17.

Figure 18:
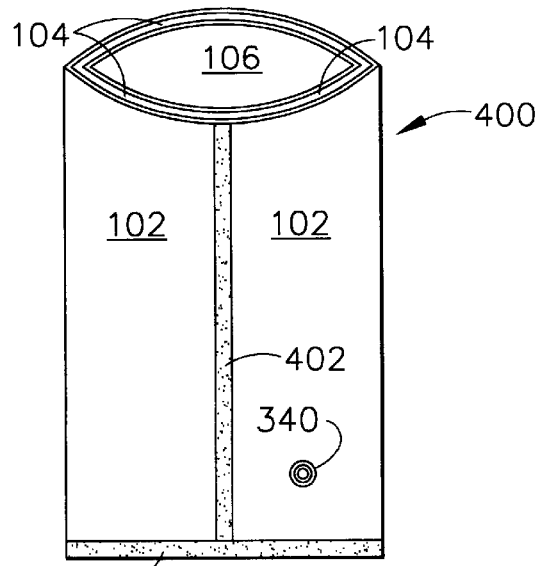
FIG. 18 is a front view in partial cut-away of the dunnage bag of FIG. 16.

In FIG. 18, the dunnage bag 400 is viewed in a partial cut-away view, so that the paper substrate 104 can be viewed as having an inner coating 106 and an outer coating 102, as described hereinabove. The inner resin coating 106 acts as the bladder, which prevents the need for a separate bladder ply or layer, as typically found in conventional dunnage bags.

Figure 19:
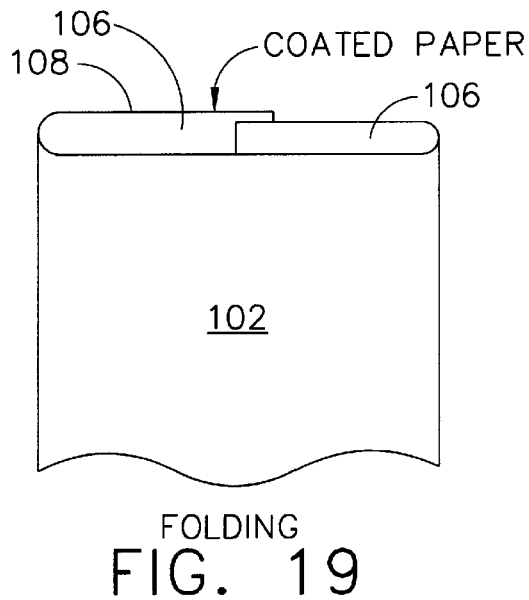
FIG. 19 is a front perspective view of a tube of single-ply dunnage material as per FIG. 5, before any seals are made.
Figure 23:
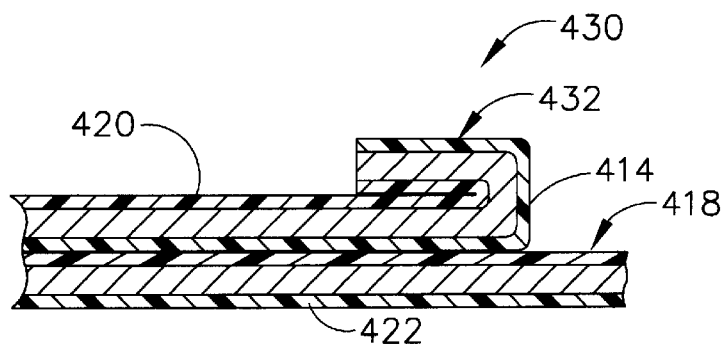
FIG. 23 is an elevational view in cross-section of the single fold and seal to partially form the end joint of the dunnage bag illustrated in FIG. 22.
Figure 24:
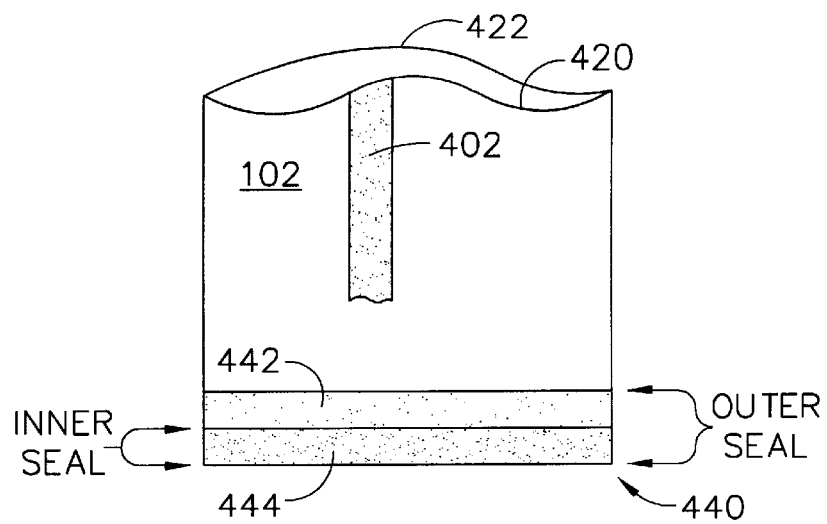
FIG. 24 is a front view partial cut-away view of the dunnage bag of FIG. 22, after a double fold and seal operation has occurred.
Figure 25:
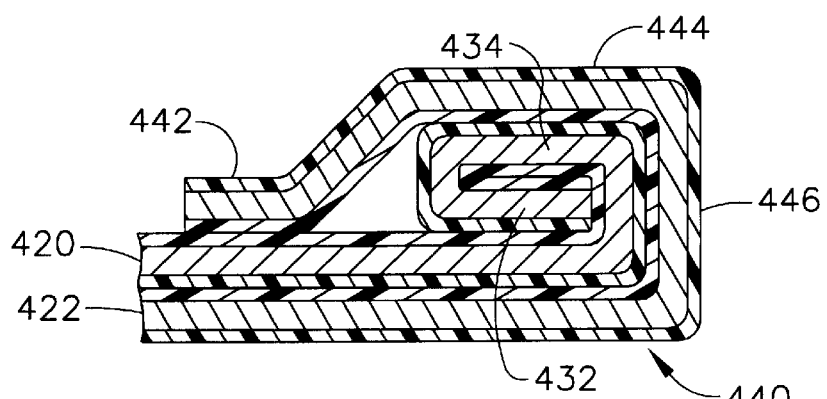
FIG. 25 is an elevational view in cross-section of the double fold and seal end joint of the dunnage bag of FIG. 24.

FIGS. 19–25 illustrate a preferred methodology for forming an end seal of dunnage bags of the present invention, in which the final end seal depicted in FIG. 25 has a very similar appearance to the end seal 230 depicted in FIG. 11. Referring now to FIG. 19, the dunnage material 108 is illustrated as being placed in a sheet form so that it exhibits two 180° angles that are used to create its left portion and right portion, as viewed on FIG. 19. These 180° angles are not necessarily sharp fold points, but could instead consist of relatively mild angular turns in the material. A single ply of dunnage material 108 is used in the example illustrated in FIGS. 19–25. The innermost portion of the dunnage bag comprises the resin coating 106 of the dunnage material 108, and the outermost portion comprises the resin coating 102.

Figure 20:
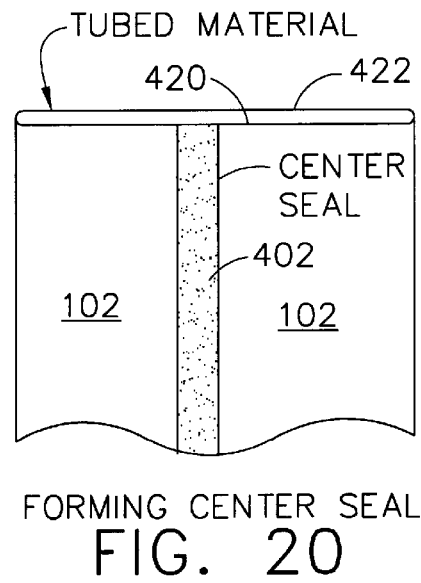
FIG. 20 is a front view of the tubed material of FIG. 19 after a center seal has been formed.

In FIG. 20, dunnage material 108 has been formed into a tube by creating a center seal, as depicted by the reference numeral 402. The perimeter of the tubed material is illustrated at the reference numerals 420 and 422, in which the near edge (as viewed in Figure 20) is depicted at 420, and the far edge is depicted at 422.

Figure 21:
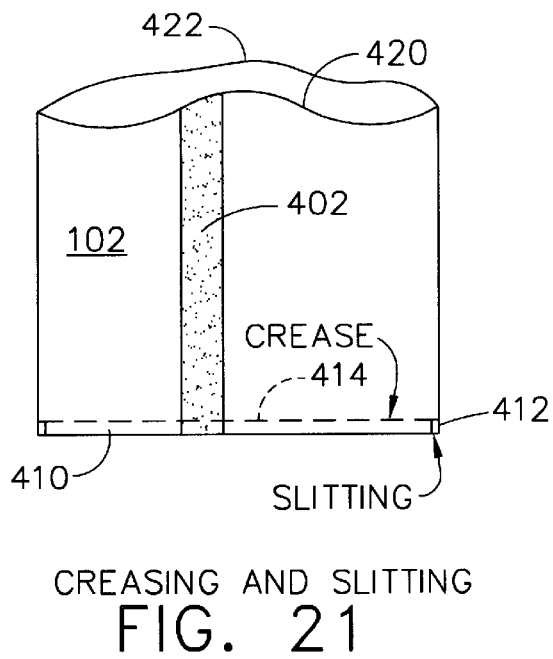
FIG. 21 is a front partial cut-away view of the tubed material with center seal of FIG. 20, after a slitting and creasing operation has occurred.
Figure 22:
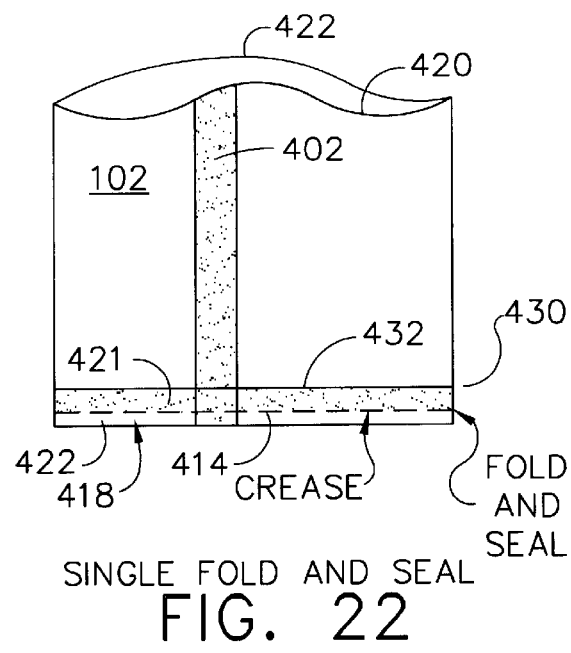
FIG. 22 is a front partial cut-away view of the dunnage bag of FIG. 21 after a fold and seal operation has occurred.

FIG. 21 illustrates a partial cut-away view of the preferred dunnage bag being constructed, and shows the bottom edge as having been slit along two side portions, as designated at the reference numerals 410 and 412. After the slits 410 and 412 have been made, the top (as viewed in FIG. 21) layer of the dunnage material is creased along a line 414. In FIG. 22, this crease or fold line 414 is now utilized to fold back this top layer of the dunnage bag material, and this area that has been folded over upon itself is depicted at 421. The fold line 414 and folded area 421 now exposes a bottom layer area at 422 that was not viewable until the top layer area 420 was folded back upon itself.

It is helpful to now refer to FIG. 23 so as to see an elevational view of this intermediate stage of forming the end seal. The area 418 represents the top surface of the bottom layer of the dunnage bag that has been exposed along the fold line 414, and the area 432 represents the top layer that has been exposed by the fold in the top portion of the dunnage bag material. Actually, the area 432 now shows the innermost coating of the top portion or layer of the dunnage bag, since it has been folded at approximately a 180° angle, so that the top-most portion of this area of the dunnage bag is actually the "inner" bladder coating area.

It is preferred that a heating operation now take place to seal the segment that is represented by the area 432 with its own top layer at 421. This creates a seal 430 when the heating and cooling steps occur with mechanical pressure applied to the fold areas 432 and 421.

FIG. 24 illustrates the final folding and sealing operation, in which a double fold is used to fold over not only the top layer 420 of the dunnage bag, but also the bottom layer 422 of the dunnage bag. It is also helpful to refer to FIG. 25 which shows an elevational view in cross-section of the final end seal construction. The top portion at 421 is folded back upon itself, until its former top segment 432 is now within another fold, and a new top segment at 434 is now formed. The bottom layer 422 is folded over until it exhibits a substantially 90° angle so that it rises as a vertical line segment at 446 (as seen on FIG. 25), and then another substantially 90° angle is formed so that it runs in a horizontal plane at 444. Finally, the endmost portion at 442 of the top layer 422 is formed and is folded over and down to become a reinforcing joint. Once these layers have been formed by the folding operations, it is preferred that heat under pressure be applied to seal this final form end joint, which is designated by the reference numeral 440 in FIGS. 24 and 25.

Figure 26:
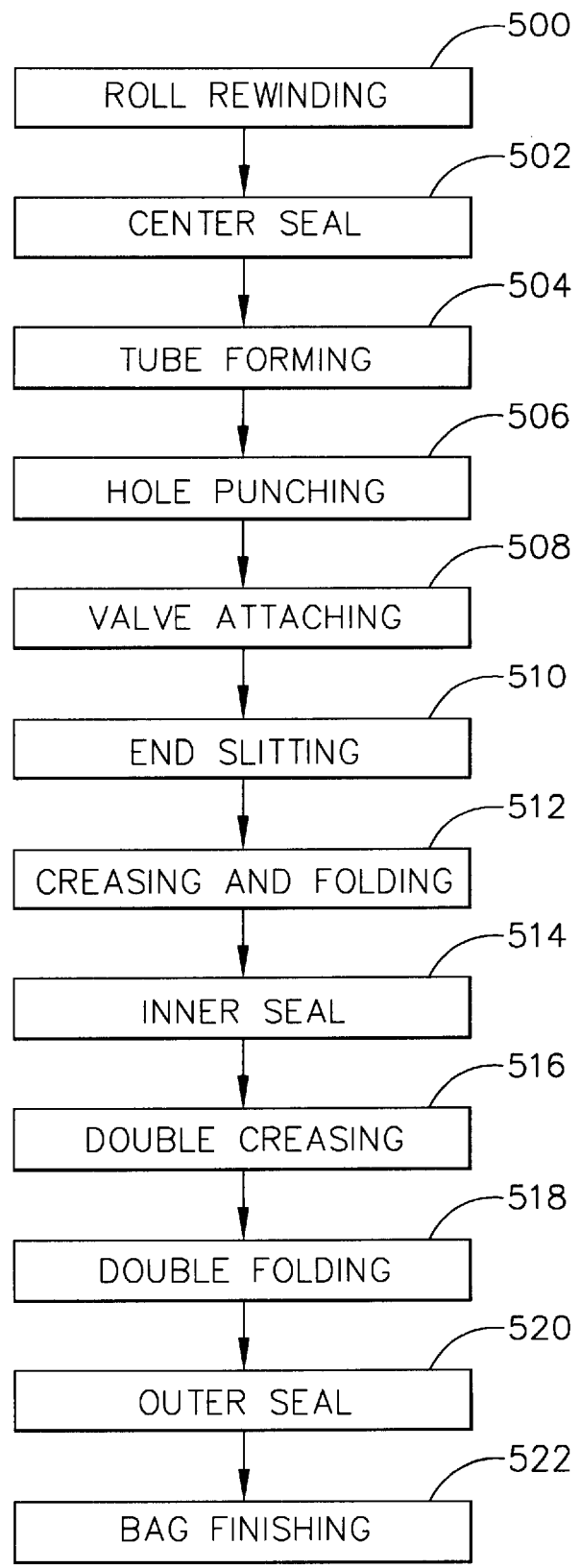
FIG. 26 is a flow chart showing the major operational steps in creating a dunnage bag constructed according to the principles of the present invention.

FIG. 26 is a flow chart of some of the important method steps for manufacturing a dunnage bag constructed according to the principles of the present invention. Beginning with a step 500, a roll rewinding step is performed, followed by a step 502 where a center seal is formed in the dunnage bag material which is similar to that illustrated on FIG. 20. A step 504 now forms a tube of the dunnage bag material, also similar to that illustrated in FIG. 20. It will be understood that this "tubular" shape of the dunnage material, such as illustrated in FIG. 20, is preferably not a pure cylindrical shape, and in fact is more of a very flattened oval. Moreover, it will be further understood that virtually any shape of this "tube" would be usable in the present invention, with the requirement being that the dunnage material of the top and bottom portions of the "tube" be sufficiently spaced apart to allow the center seal to be formed in the top sheet material without causing the top and bottom inner surfaces to seal against one another.

A step 506 now punches a hole where required, and a step 508 then attaches an inlet air valve in the hole, preferably using a heat sealing operation to melt the inner resin coating of the dunnage material against the flange of the air valve (e.g., flange 348 of air valve 340, in FIG. 14), then allow the resin coating to solidify to hold the air valve in place (e.g., see FIG. 15).

A step 510 now performs an end slitting operation, similar to that illustrated in FIG. 21. A creasing and folding step is then performed at a step 512, which is similar to that illustrated in FIG. 22. An inner seal is then formed in a step 514, which is similar to that illustrated in FIGS. 22 and 23.

A double creasing step at 516 and a double folding step at 518 are performed, which is similar to that illustrated in FIGS. 24 and 25. An outer seal is then formed at a step 520, also similar to that illustrated in FIGS. 24 and 25. A final bag finishing step then occurs at a step 522.

It will be understood that the precise logical operations depicted in the flow chart of FIG. 26, and discussed hereinabove, could be somewhat modified to perform similar, although not exact, functions without departing from the principles of the present invention. The exact nature of some of the decision steps and other commands in these flow charts are directed toward a specific shape of dunnage bag and certainly similar, but somewhat different, steps could be taken for use with other shapes of dunnage bags in many instances, although the overall inventive results would be the same.

Figure 27:
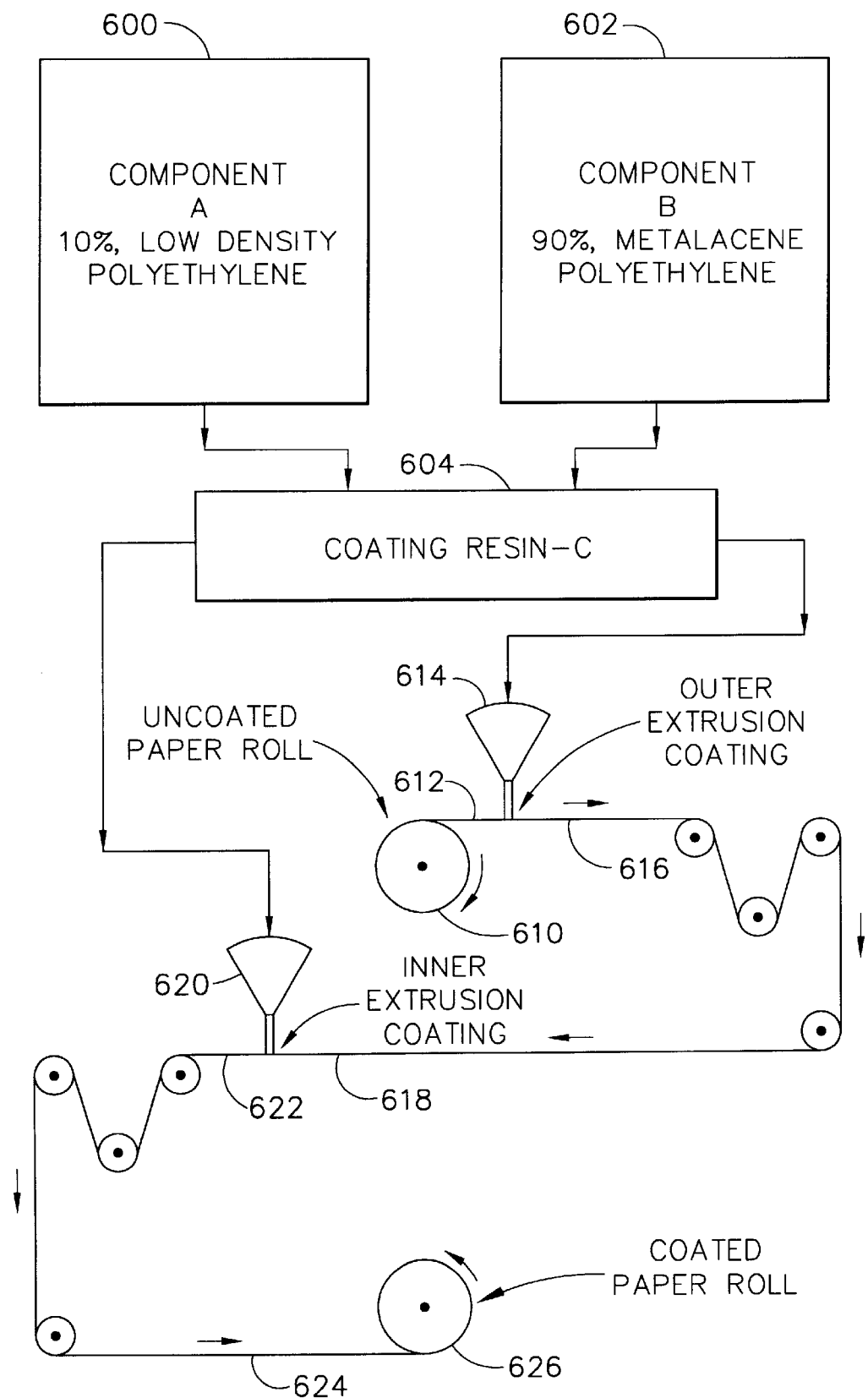
FIG. 27 is a mechanical schematic in block diagram format of the process for forming a coating resin and applying that coating resin to both surfaces of uncoated kraft paper, according to the principles of the present invention.

FIG. 27 shows some of the mechanical forming steps, in a mechanical schematic block diagram format, for creating a coated sheet of dunnage bag material, according to the principles of the present invention. Starting with a block 600, a chemical component "A" is provided in a certain percentage, in which the preferred material is a low density polyethylene that will be used for about 10% of the coating resin to be applied to the sheet of kraft paper substrate. A block 602 provides a chemical component "B" which preferably is a metalacene formed polyethylene, which forms about 90% of the coating resin to be applied to the kraft paper substrate. A step 604 combines component A and component B to become the coating resin "C," which preferably has the following properties: a melt index in the range of 3.0–4.0 g/10 min., a density in the range of 0.91–0.94 g/cc, a sealing temperature in the range of 105–135° C., and a sealing energy of about 0.54 joules/g/C.

Coating resin C is used in two places to coat the top and bottom surfaces of the kraft paper substrate that begins on a roll at 610. This roll 610 holds an uncoated roll of kraft paper in the preferred mode of the invention, and as it unwinds from the roll 610 it forms an elongated sheet at 612. Coating resin C is heated sufficiently at a station at 614 and then is applied in an extrusion coating step at station 614 to form a coated portion of the dunnage material, which is illustrated at 616. After travelling through some downstream rollers, the partially-formed sheet of dunnage material is then presented to a second coating station 620 as it travels along a pathway at 618. At second coating station 620, the opposite side or surface of the kraft paper is coated in a similar extrusion process, and the finished dunnage material is then transported along a pathway at 622 through several rollers to a coated paper roll at 626 after traveling along a pathway 624.

Figure 28:
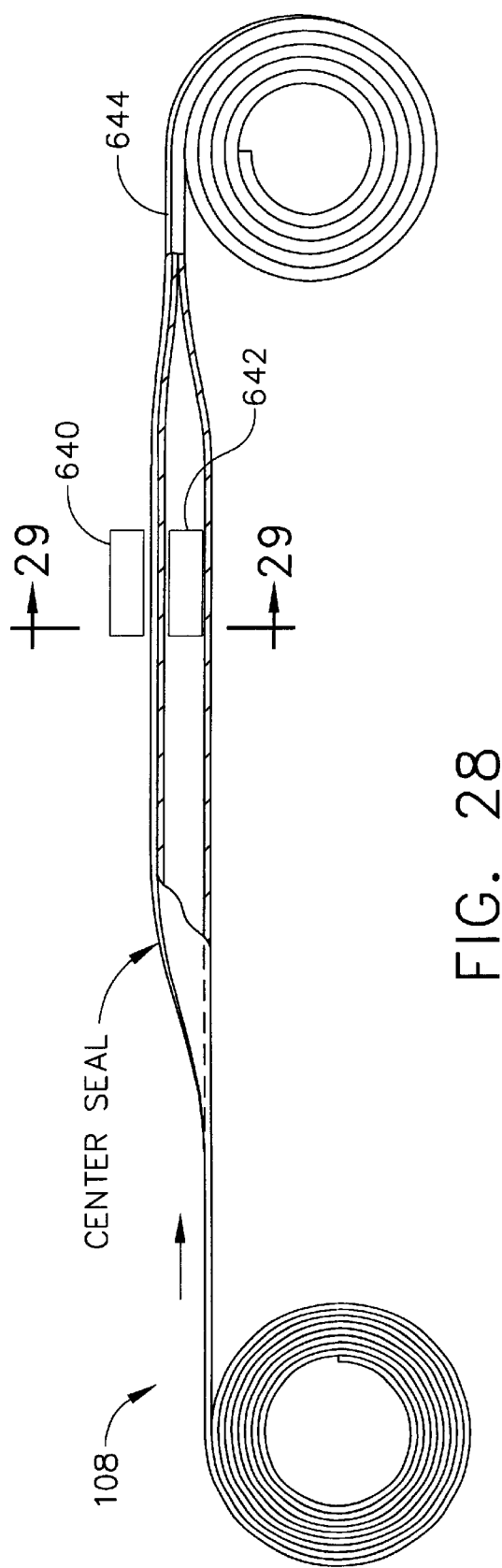
FIG. 28 is an elevational view of a tube of dunnage material having a center seal being formed while the tube is in motion.
Figure 29:
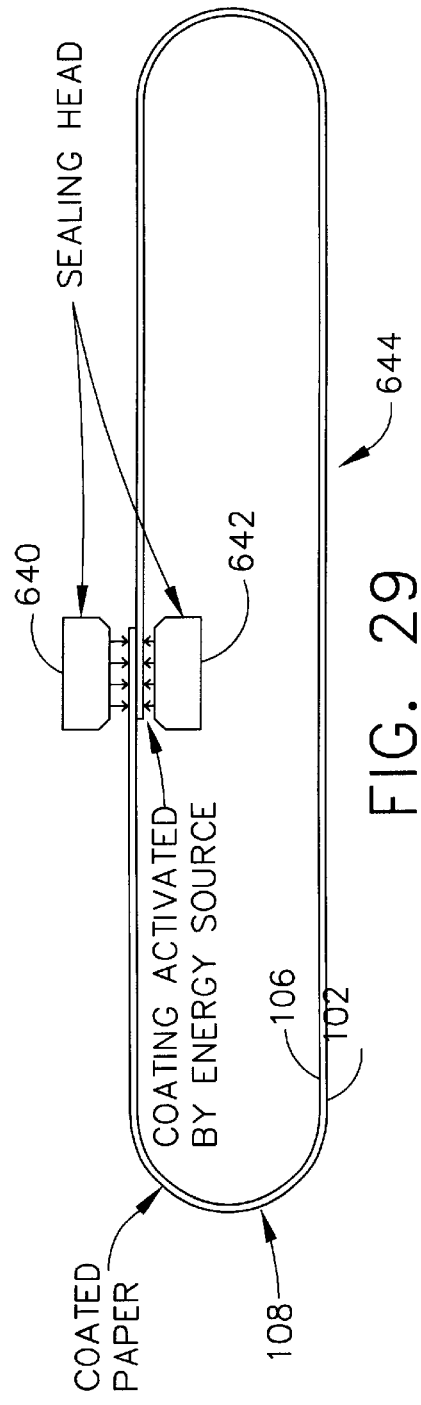
FIG. 29 is a cross-section view of the tube of dunnage material illustrated in FIG. 28 as the center seal is being formed by ultrasonic horns.

FIGS. 28 and 29 illustrate in a mechanical schematic format the creation of a center seal using the dunnage material of the present invention. In FIG. 28, the coated kraft paper 108 has been formed into an oval-shaped tube, as indicated at the reference numeral 644. This tube is seen in an enlarged cross-section view in FIG. 29, and it is apparent that the top and bottom portions of the Kraft paper are in a spaced-apart configuration. A pair of sealing head stations at 640 and 642 are used to sufficiently heat the resin coating so that a center seal will be formed by melting the resin coating, while the tube 644 is being transported past the stations 640 and 642. It is preferred that the sealing heads are independently supported above and below the tube of material 644 as it is being formed, and further preferred that there is no contact between the sealing heads 640 and 642 and the web or tube of material 644 as the center seal is being created.

The preferred sealing principle is to activate the resin coating by energy and have this coating bonded by contact with the opposite coating of the second layer of the dunnage material. The coating material is first melted and then fused together, after which it is solidified by cooling. Various energy sources can be used to activate the resin coating, including direct application of heat due to electromagnetic radiation, hot air, open flame, or some type of high frequency energy source, such as an ultrasonic "horn." The ultrasonic sound waves can be made directional to aim directly at the area in which the center seal is to be formed, and a manufacturer of such ultrasonic horns is a company named Sonabond, located in West Chester, Pa.

One form of electromagnetic radiation to be applied as heat energy would be to use a laser beam of light along the sealing pathway of the tube of material at 644. In addition, it would also be possible to use inductive heating if a metal backing plate were used just beneath the web of material where the center seal is to be formed; a magnetic field could be used to inductively heat the metal plate, which then by heat transfer could activate the resin coating to achieve its melting temperature.

For the center seal to be properly made, the web or sheet of dunnage material needs to first be aligned, then passed through the energy activation step (e.g., where the ultrasonic horns are located); the two layers of dunnage material must make contact with one another during the energy activation procedure and pressure between the two layers of the dunnage material must be maintained so that bonding occurs during the heating step and then the coatings solidify together during the cooling of the material once it has passed the energy activation station. The seal will then be permanently formed upon solidification of the resin material. The center seal is formed in a rolling process, while the web of material is in motion, preferably using a continuous heat sealing operation.

Figure 30:
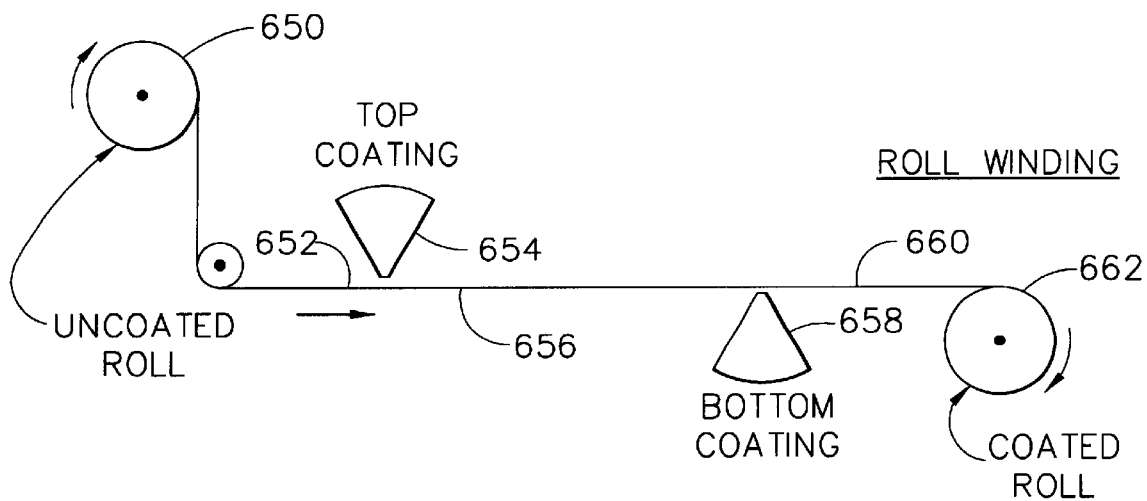
FIG. 30 is a mechanical schematic diagram of a roll rewinding and roll winding operation to form a top and bottom coating of resin on kraft paper, according to the present invention.

FIG. 30 is another mechanical schematic diagram showing a rolling process to create the dunnage material having a kraft paper substrate with a resin coating on its top and bottom surfaces. An uncoated roll of kraft paper is illustrated at 650 as the starting point, and as the paper unwinds from the roll 650 it travels along a pathway 652 to a top coating station 654. After the top resin coating has been applied, preferably using an extrusion process, the partially coated paper is directed along a pathway 656 to a bottom coating station at 658. At this point, the kraft paper is again coated using preferably an extrusion process, and the finished dunnage material is directed along a pathway 660 to a roll winding step in which the coated paper is wound about a roll 662.

Figure 31:
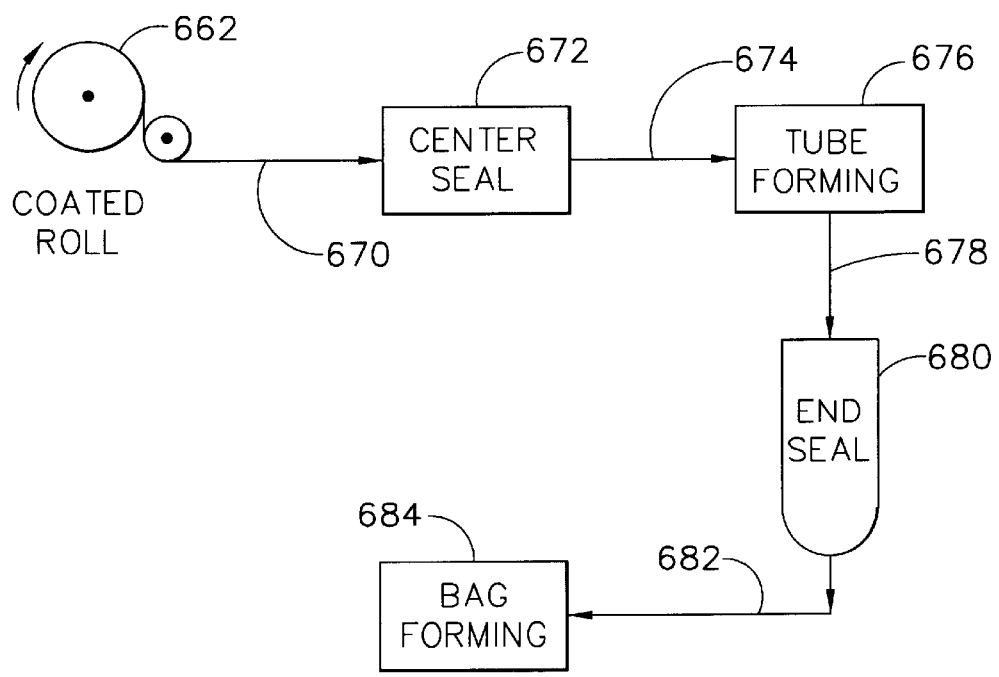
FIG. 31 is a mechanical schematic diagram of a bag forming operation using the coated dunnage material formed in FIG. 30.

FIG. 31 is yet another mechanical schematic diagram, showing the coated roll 662 of kraft paper being formed into a dunnage bag. The first step is to unwind the coated roll of paper (i.e., the dunnage material) 662 and direct it along a pathway 670 to a center seal station 672. At this time, the paper is then directed along a pathway 674 to a tube forming station 676. The output of that station 676 is a tube of dunnage material that is of a proper size to be formed into a dunnage bag. It will be understood that this "tube" is not necessarily cylindrical in shape; i.e., it will probably not have a purely circular cross-section profile, but will be substantially flattened.

The tube of dunnage material is directed along a pathway 678 to an end seal station 680, after which the bag material is sent along a pathway 682. It finally arrives at a bag forming station 684 where the opposite end seal is formed and the bag material is cut to proper size, thereby forming the finished dunnage bag. The inlet air valve is also applied at one of the sealing stations. The end seals are formed in a rolling process, while the web of material is in motion, preferably using a continuous heat sealing operation.

The final dunnage bag will have a leak-proof center seal, a reinforced leak-proof end seal, and a one-way air valve used for filling the interior space of the dunnage bag with air, and will comprise at least a single ply of dunnage material made up of an extensible kraft paper substrate with the plastic resin coating on both its inner and outer surfaces. The use of the kraft paper substrate having a resin coating on both surfaces eliminates the need for a separate bladder, and allows a stronger dunnage bag by allowing the strength of the plastic coating material to be the definitive factor in the seals that are used to create the bag.

The use of the preferred coating resin material makes the dunnage bag of the present invention impermeable to air, and also to certain liquids. The preferred plastic resin composition provides an improved bursting strength, puncture resistance, tear resistance, tensile strength, stretch properties, sealing properties, and barrier properties. Furthermore, the preferred plastic resin is a controlled melt index resin which allows it to be used for extrusion coating applications. When this resin is extrusion coated to the extensible kraft paper, it provides the above functional properties to the paper, which gives sufficient mechanical and stretch properties so as to be suitable for dunnage bags. For example, once it is applied as a coating onto the kraft paper, the preferred resin material will improve the paper's bursting strength, puncture resistance, tear resistance, tensile strength, wet strength properties, and energy absorption properties.

The center seals and end seals are made leakproof by special folding and interlocking techniques. The seals can be lap seals or fin seals, particularly for the center seals. The seals are also made to attach the one-way air valve to the inner layer of the dunnage bag material. The resin composition that has been developed for the present invention has a controlled melt flow property, plus physical and chemical properties for extrusion coating on special extensible kraft paper. The preferred kraft paper is a special kraft paper having modified stretch properties in Machine and Cross directions to achieve required functional properties, such as kraft paper manufactured by International Paper Company, under part number "IP Extensible Kraft." The resulting coated dunnage bag material has an improved shock and energy absorbing property, improved mechanical strength properties, sealing properties, stretching properties, and barrier properties to trap air inside the bag.

The reinforced coated material used as the dunnage material for the present invention can be used in vertical and horizontal form-fill-seal machines to make the bags. During the manufacturing process, a continuous tube of dunnage material is made by sealing a continuous web of the dunnage material while making a center seal while it is moving. This continuous paper tube manufacturing process is easily performed by using a lap seal or a fin seal process. Both longitudinal and horizontal seals can be made using a continuous heat sealing technique. As noted above, the heat seal is accomplished by activating the resin coating using an energy source such as hot air, flame, electricity, high frequency sound waves, or other types of energy sources.

The dunnage bag itself can be made of multiple plies of material, in which the dunnage material would always be used for the most inner layer or ply, and multiple plies of paper or other materials can then be added for outer and mid-layers. The middle layers can act as reinforcement layers and can be made of film, paper, cloth, non-woven material, or any other suitable reinforcement material.

It would even be possible to create a valveless dunnage bag which is pre-inflated just before, or while, simultaneously making the final end seal. This would be usable for applications where the precise desired volume is known in advance in which the dunnage bag is to be used.

The preferred kraft paper material is a 100 pound extensible kraft paper. The extrusion coating will preferably consist of five mills of plastic resin after it has solidified, which is approximately 75 pounds per ream of material.

The kraft paper substrate with the coating material on both surfaces will provide a seal strength of about 15.68 pounds per inch in a material evaluation seal strength test, which is the average of both the MD and CD directions. This is a great improvement over current 5 mil polyfilm, which has a seal strength of only about 5.42 pounds per inch using a fin seal. This is still a greater improvement over current paper glue seals in which a lap seal provides a seal strength of only about 2.17 pounds per inch.

Finally, a comparison of the uncoated kraft paper versus the kraft paper that has been coated with the resin material preferred in the present invention is as follows:

TABLE #1

|  | Uncoated Kraft | Coated Kraft |
| --- | --- | --- |
| Basis Weight (lbs/ream) | 92.3 | 173.7 |
| Tensile (lb/in) | 40.3 | 47.1 |
| Stretch (Percent) | 5.0 | 7.2 |
| Tear (grams) | 238 | 1728 |
| Mullen (psi) | 110 | 135.9 |
| Total Energy Absorption (ft-lb/sq. ft) | 15.6 | 28.5 |

It will be understood that the physical orientations described in relation to the mechanical schematic diagrams of FIGS. 27, 30, and 31 can be somewhat modified without departing from the principles of the present invention. For example, the coating stations could be reversed, or the roll placements could be altered, and the overall result would be substantially the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A material used to construct bags, comprising:
    a flexible paper substrate, said paper substrate having a first surface and a second surface;
    a first coating material substantially covering the entire first surface of said paper substrate, said first coating material comprising a compound consisting of a low density polyethylene and a metalacene process polyethylene; and
    a second coating material substantially covering the entire second surface of said paper substrate, said second coating material comprising a compound consisting of a low density polyethylene and a metalacene process polyethylene.

2. The material as recited in claim 1, wherein said paper substrate comprises extensible kraft paper, and wherein said first coating material and said second coating material each exhibit properties of being extrudable, impermeable to air, heat sealable, able to absorb shock energy, and usable as a coating on extensible kraft paper.

3. The material as recited in claim 2, wherein said material is used for constructing a bladderless dunnage bag, such that said first coating material acts as a bladder layer in the interior portions of said bladderless dunnage bag.

4. The material as recited in claim 2, wherein said first coating material and said second coating material each comprise: 10% to 20% low density polyethylene, and 80% to 90% metalacene process polyethylene.

5. A material used to construct bags, comprising:
- a flexible paper substrate, said paper substrate having a first surface and a second surface; and
- a coating material substantially covering the entire first surface of said paper substrate, said coating material comprising a compound consisting of a low density polyethylene and a metalacene process polyethylene.

6. The material as recited in claim 5, wherein said paper substrate comprises extensible kraft paper, and wherein said coating material exhibits properties of being extrudable, impermeable to air, heat sealable, able to absorb shock energy, and usable as a coating on extensible kraft paper; and wherein said material is used for constructing a bladderless dunnage bag, such that said coating material acts as a bladder layer in the interior portions of said bladderless dunnage bag.

7. The material as recited in claim 6, wherein said coating material comprises: 10% to 20% low density polyethylene, and 80% to 90% metalacene process polyethylene.

* * * * *